United States Patent
Johansson et al.

(10) Patent No.: US 10,616,856 B2
(45) Date of Patent: Apr. 7, 2020

(54) METHODS AND ARRANGEMENTS FOR SUPPORTING POSITIONING OF A WIRELESS DEVICE IN A WIRELESS COMMUNICATION NETWORK

(71) Applicant: Telefonaktiebolaget LM Ericsson (publ), Stockholm (SE)

(72) Inventors: Nicklas Johansson, Brokind (SE); John Walter Diachina, Garner, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/344,204

(22) PCT Filed: Oct. 26, 2017

(86) PCT No.: PCT/SE2017/051054
§ 371 (c)(1),
(2) Date: Apr. 23, 2019

(87) PCT Pub. No.: WO2018/084773
PCT Pub. Date: May 11, 2018

(65) Prior Publication Data
US 2019/0261302 A1 Aug. 22, 2019

Related U.S. Application Data
(60) Provisional application No. 62/416,718, filed on Nov. 3, 2016.

(51) Int. Cl.
*H04W 64/00* (2009.01)
*G01S 5/02* (2010.01)
*G01S 5/14* (2006.01)

(52) U.S. Cl.
CPC ........... *H04W 64/00* (2013.01); *G01S 5/0226* (2013.01); *G01S 5/14* (2013.01)

(58) Field of Classification Search
CPC ......... H04W 64/00; G01S 5/0226; G01S 5/14
See application file for complete search history.

(56) References Cited

FOREIGN PATENT DOCUMENTS

RU        2517389 C2    5/2014

OTHER PUBLICATIONS

3GPP, "3rd Generation Partnership Project; Technical Specification Group GSM/EDGE Radio Access Network; General Packet Radio Service (GPRS); Mobile Station (MS)—Base Station System (BSS) interface; Radio Link Control / Medium Access Control (RLC/MAC) protocol (", 3GPP TS 44.060 V13.2.0 (Jun. 2016), Jun. 2016, 1-744.

(Continued)

Primary Examiner — Nizar N Sivji
(74) Attorney, Agent, or Firm — Murphy, Bilak & Homiller, PLLC

(57) ABSTRACT

Method by a wireless device (120) for supporting positioning of the wireless device (120) in a wireless communication network (100). The wireless device (120) receives (501, 801) from a first network node (110), a positioning request. The wireless device (120) is served in by the first network node (110) when receiving the positioning request. The positioning request requests the wireless device (120) to initiate a multilateration. In response, the wireless device (120) sends (504, 804a) to a second network node (113) comprised in the wireless communication network (100), a positioning access request indicating that the access request relates to a multilateration positioning and requesting the second network node (113) to estimate a Timing Advance (TA) for the wireless device (120). The wireless device (120) sends (505, 804a, 804c), to the second network node (113), (Continued)

an obtained device identifier identifying the wireless device (120), and an obtained source identifier identifying the first network node (110).

20 Claims, 14 Drawing Sheets

(56) References Cited

OTHER PUBLICATIONS

3GPP, "3rd Generation Partnership Project; Technical Specification Group GSM/EDGE Radio Access Network; Location Services (LCS); Base Station System Application Part LCS Extension (BSSAP-LE) (Release 13)", 3GPP TS 49.031 V13.0.0, Jan. 2016, 1-52.

3GPP, "3rd Generation Partnership Project; Technical Specification Group Radio Access Network; General Packet Radio Service (GPRS); Mobile Station (MS)—Base Station System (BSS) interface; Radio Link Control / Medium Access Control (RLC/MAC) protocol", 3GPP TS 44.060 V13.3.1, Sep. 2016, 1-745.

Unknown, Author, "Energy Consumption Analysis of Radio Interface Procedures for Positioning Enhancements", 3GPP TSG RAN6 #1, R6-160086 Update of R6-160036, Gothenburg, Sweden, Aug. 22-26, 2016, 1-11.

Unknown, Author, "Multilateration Procedure—TA Only", RAN WG6 Meeting #2, R6-160142, Reno, Nevada, Nov. 14-18, 2016, 1-53.

Unknown, Author, "Multilateration Signaling for GERAN", RAN WG6 Meeting #1, R6-160018, LM Ericsson, Gothenburg, Sweden, Aug. 22-26, 2016, 1-11.

Unknown, Author, "New Work Item Positioning Enhancements for GERAN", 3GPP TSG RAN Meeting #72, RP-161260, revision of RP-161033, Busan, Korea, Jun. 13-16, 2016, 1-8.

Unknown, Author, "Positioning enhancements for GERAN—introducing Timing Advance trilateration", 3GPP TSG RAN#72 RP-161034 Busan, Korea Source: Ericsson, Jun. 13-16, 2016, 1-7.

Unknown, Author, "Radio Interface Enhancements for TA based multilateration (Update of RP-160034)", 3GPP TSG-RAN WG6 #1, R6-160054, Gothenburg, Sweden, Aug. 22-26, 2016, 1-10.

Unknown, Author, "Radio Interface Enhancements for TA based multilateration (Update of RP-160034)", 3GPP TSG-RAN WG6 #1, R6-160085, Gothenburg, Sweden, Aug. 22-26, 2016, 1-10.

Unknown, Author, "System level simulations for positioning enhancements—Methods and Results", 3GPP TSG RAN6#1, Tdoc R6-160012, Gothenburg, Sweden, Aug. 22-26, 2016, 1-7.

METHODS AND ARRANGEMENTS FOR SUPPORTING POSITIONING OF A WIRELESS DEVICE IN A WIRELESS COMMUNICATION NETWORK

TECHNICAL FIELD

Embodiments herein relate to methods and arrangements for supporting positioning of a device, e.g., a wireless device, in a wireless communication network, e.g., a telecommunication network, such as a Global System for Mobile communications (GSM) based network, e.g. Extended Coverage GSM (EC-GSM-IoT). In particular, the present disclosure relates to a wireless device and methods performed thereby for supporting positioning of the wireless device in a wireless communication network. The present disclosure relates as well to a second network node and methods performed thereby for supporting positioning of the wireless device in the wireless communication network.

BACKGROUND

Communication devices such as wireless communication devices, that simply may be named wireless devices, may also be known as e.g. User Equipments (UEs), mobile terminals, wireless terminals and/or Mobile Stations (MS). A wireless device is enabled to communicate wirelessly in a wireless communication network that typically is a cellular communications network, which may also be referred to as a wireless communication system, or radio communication system, sometimes also referred to as a cellular radio system, cellular network or cellular communication system. A wireless communication network may sometimes simply be referred to as a network and abbreviated NW. The communication may be performed e.g. between two wireless devices, between a wireless device and a regular telephone and/or between a wireless device and a server via a Radio Access Network (RAN) and possibly one or more Core Networks (CN), comprised within the wireless communication network. The wireless device may further be referred to as a mobile telephone, cellular telephone, laptop, Personal Digital Assistant (PDA), tablet computer, just to mention some further examples. Wireless devices may be so called Machine to Machine (M2M) devices or Machine Type Communication (MTC) devices, i.e. a device that is not necessarily associated with a conventional user, such as a human, directly using the device. MTC devices may be as defined by 3GPP.

The wireless device may be, for example, portable, pocket-storable, hand-held, computer-comprised, or vehicle-mounted mobile device, enabled to communicate voice and/or data, via the RAN, with another entity, such as another wireless device or a server.

The cellular communication network covers a geographical area which is divided into cell areas, wherein each cell area is served by at least one base station, or Base Station (BS), e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell may be typically identified by one or more cell identities. The base station at a base station site provides radio coverage for one or more cells. A cell is thus associated with a geographical area where radio coverage for that cell is provided by the base station at the base station site. Cells may overlap so that several cells cover the same geographical area. By the base station providing or serving a cell is meant that the base station provides radio coverage such that one or more wireless devices located in the geographical area where the radio coverage is provided may be served by the base station in said cell. When a wireless device is said to be served in or by a cell this implies that the wireless device is served by the base station providing radio coverage for the cell. One base station may serve one or several cells. Further, each base station may support one or several communication technologies. The base stations communicate over the air interface operating on radio frequencies with the wireless device within range of the base stations.

In some RANs, several base stations may be connected, e.g. by landlines or microwave, to a radio network controller, e.g. a Radio Network Controller (RNC) in Universal Mobile Telecommunication System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communication (originally: Groupe Spécial Mobile).

In 3rd Generation Partnership Project (3GPP) Long Term Evolution (LTE), base stations, which may be referred to as eNodeBs or eNBs, may be directly connected to other base stations and may be directly connected to one or more core networks.

UMTS is a third generation mobile communication system, which may be referred to as 3rd generation or 3G, and which evolved from the GSM, and provides improved mobile communication services based on Wideband Code Division Multiple Access (WCDMA) access technology. UMTS Terrestrial Radio Access Network (UTRAN) is essentially a radio access network using wideband code division multiple access for wireless devices.

General Packet Radio Service (GPRS) is a packet oriented mobile data service on the 2G cellular communication system's global system for mobile communications (GSM).

Enhanced Data rates for GSM Evolution (EDGE) also known as Enhanced GPRS (EGPRS), or IMT Single Carrier (IMT-SC), or Enhanced Data rates for Global Evolution is a digital mobile phone technology that allows improved data transmission rates as a backward-compatible extension of GSM.

High Speed Packet Access (HSPA) is an amalgamation of two mobile telephony protocols, High Speed Downlink Packet Access (HSDPA) and High Speed Uplink Packet Access (HSUPA), defined by 3GPP, that extends and improves the performance of existing 3rd generation mobile telecommunication networks utilizing the WCDMA. Such networks may be named WCDMA/HSPA.

The 3GPP has undertaken to evolve further the UTRAN and GSM based radio access network technologies, for example into evolved UTRAN (E-UTRAN) used in LTE.

The expression downlink, which may be abbreviated DL, is used for the transmission path from the base station to the wireless device. The expression uplink, which may be abbreviated UL, is used for the transmission path in the opposite direction i.e. from the wireless device to the base station.

Machine Type Communication (MTC) has in recent years, especially in the context of the Internet of Things (IoT), shown to be a growing market segment for cellular technologies. An MTC device may be a communication device, typically a wireless communication device or simply wireless device, that is a self and/or automatically controlled unattended machine, and that is typically not associated with an active human user in order to generate data traffic. An MTC device may be understood to be typically more simple, and typically associated with a more specific application or purpose, than and in contrast to a conventional mobile phone or smart phone. MTC involves communication in a wireless communication network to and/or from MTC devices, which communication typically is of quite different nature and with other requirements than communication associated with e.g. conventional mobile phones and smart phones. In the context of and growth of the IoT it is evidently so that MTC traffic will be increasing and thus needs to be increasingly supported in wireless communication systems.

A general problem related to (re)using existing technologies and systems is that the requirements for the new type of devices are typically different than conventional requirements, e.g. regarding the type and amount of traffic, performance etc. Existing systems have not been developed with these new requirements in mind. Also, traffic generated by new type of devices will typically be in addition to conventional traffic already supported by an existing system, which existing traffic may typically need to continue to be supported by and in the system, preferably without any substantial disturbance and/or deterioration of already supported services and performance.

Any need of modifications of existing systems and technology may benefit from being cost efficient, such as enabled by low complexity modifications, and preferably allowing legacy devices, i.e. devices already being employed, to continue to be used and co-exist with the new type of devices in one and the same wireless communication system.

At the meeting RAN #72, a Work item on "Positioning Enhancements for GERAN" was approved, see e.g. RP-161260, "New Work Item on Positioning Enhancements for GERAN", Ericsson L M, Orange, MediaTek Inc., Sierra Wireless, Nokia, RAN #72. One candidate method for realizing improved accuracy when determining the position of a MS (mobile station) is TA (timing advance) multilateration, which relies on establishing the MS position based on TA values in multiple cells. See e.g. RP-161034, "Positioning Enhancements for GERAN—introducing TA trilateration", Ericsson L M, RAN #72.

At RAN1#86, a proposal based on a similar approach was made also to support positioning of Narrow Band IoT (NB-IoT) mobiles.

TA is a measure of the propagation delay between a BTS (base transceiver station) and the MS, and since the speed by which radio waves travel is known, the distance between the BTS and the MS may be derived. Further, if the TA applicable to a MS is measured within multiple BTSs and the positions of these BTSs are known, the position of the MS may be derived using the measured TA values. Measurement of TA may require that the MS synchronizes to each neighbor BTS, and transmits a signal time-aligned with the estimated timing of the downlink channel received from each BTS. The BTS measures the time difference between its own time reference for the downlink channel, and the timing of the received signal (transmitted by the MS). This time difference is equal to two times the propagation delay between the BTS and the MS (one propagation delay of the BTS's synchronization signal sent on the downlink channel to the MS, plus one equal propagation delay of the signal transmitted by the MS back to the BTS).

Once the set of TA values are established using a set of one or more BTS during a given positioning procedure, the position of the device may be derived through so called Multilateration, wherein the position of the device may be determined by the intersection of a set of hyperbolic curves associated with each BTS, see e.g. FIG. 1. FIG. 1 schematically illustrates Multilateration involving three base stations associated with three timing advance values for a particular device: values $TA_1$, $TA_2$ and $TA_3$. The calculation of the position of the device may be typically carried out by the serving positioning node, i.e., the Serving Mobile Location Center (SMLC), which implies that all of the derived timing advance and associated BTS position information may need to be sent to the positioning node that initiated the positioning procedure, i.e., the serving SMLC. The BTS used during a given positioning procedure may fall into one of the following categories: foreign BTS, local BTS, and serving BTS.

A Foreign BTS may be understood as a BTS associated with a Base Station Subsystem (BSS) that uses a positioning node that is different from the positioning node used by the BSS that manages the cell serving the MS when the positioning procedure is initiated. In this case, the derived timing advance information and identity of the corresponding cell may be relayed to the serving positioning node using the core network, i.e., in this case the BSS has no context for the MS. A context may be understood as information provided to a BSS by the positioning node prior to the positioning node initiating a positioning procedure for a given MS, wherein the BSS manages the cell in which the MS is currently located and wherein the positioning node requests the BSS to begin the positioning procedure for the MS subsequent to providing the BSS with the information used for context establishment. This context information may consist of the logical connection established between the serving BSS and positioning node established as a result of the serving BSS sending a BSSMAP-LE Perform Location Request message, e.g., as defined in 3GPP TS 49.031 v13.0.0, to the positioning node and/or as a result of the serving BSS sending a BSSMAP-LE Assistance Information Request message, e.g., as defined in 3GPP TS 49.031 v13.0.0, to the positioning node after the logical connection has been established.

A Local BTS may be understood as a BTS associated with a BSS that uses the same positioning node as the BSS that manages the cell serving the MS when the positioning procedure is initiated. In this case, the derived timing advance information and identity of the corresponding cell may be relayed to the serving positioning node using the core network, i.e., in this case the BSS has no context for the MS.

A Serving BTS may be understood as a BTS associated with a BSS that manages the cell serving the MS when the positioning procedure is initiated. In this case, the derived timing advance information and identity of the corresponding cell are sent directly to the serving positioning node, i.e., in this case the BSS has a context for the MS.

Multilateration may be particularly useful for Cellular IoT devices since such devices may be subject to movement and expected to provide information for which corresponding location information may be useful. It is expected that in a near future, the population of Cellular IoT devices will be very large. Various predictions exist that assumes >60000 devices per square kilometer, and even that assumes 1000000 devices per square kilometer. A large fraction of these devices are expected to be stationary, e.g., gas and electricity meters, vending machines, etc.

EC-GSM-IoT and NB-IoT are two standards for supporting Cellular IoT devices that have been specified by 3GPP TSG GERAN and TSG RAN. Existing methods, however, do not fully support timing advance multilateration, when non-serving nodes are involved in the signalling, which may result in suboptimal location procedures and wasted energy, processing, and radio resources.

SUMMARY

It is an object to alleviate or at least reduce one or more problems indicated herein.

Hence, the object may be to provide one or more improvements with regard to positioning, such as multilateration, in a wireless communication network, in particular when it is a GSM or EC-GSM-IoT network.

According to a first aspect of embodiments herein, the object is achieved by a method, performed by a wireless device. The method is for supporting positioning of the wireless device in a wireless communication network. The wireless device is comprised in the wireless communication network. The wireless device receives, from a first network node, a positioning request. The wireless device is served in the wireless communication network by the first network node when receiving the positioning request. The positioning request requests the wireless device to initiate a multilateration positioning procedure. The positioning request is sent by a first positioning node associated with the first network node and comprised in the wireless communication network. And, in response to the received positioning request, the wireless device sends, to a second network node comprised in the wireless communication network, a positioning access request. The positioning access request indicates that the access request relates to a multilateration positioning and requests the second network node to estimate a TA for the wireless device. The wireless device sends, to the second network node, an obtained device identifier and an obtained source identifier. The obtained device identifier identifies the wireless device, and the obtained source identifier identifies the first network node.

According to a second aspect of embodiments herein, the object is achieved by a method, performed by the second network node. The method is for supporting positioning of the wireless device in the wireless communication network. The second network node and the wireless device are comprised in the wireless communication network. The second network node receives, from the wireless device, the positioning access request. The positioning access request indicates that the access request relates to the multilateration positioning, and requests the second network node to estimate the TA for the wireless device. The second network node obtains, based on the received positioning access request, the TA value indicative of the TA in relation to the wireless device and the second network node. The second network node receives, from the wireless device, the device identifier identifying the wireless device, and the source identifier identifying the first network node serving the wireless device in the wireless communications network. The second network node provides, using the received source identifier and the received device identifier, the obtained TA value in association with a cell identifier identifying a cell provided by the second network node, to at least one of: the first network node, and a first positioning node associated with the first network node.

According to a third aspect of embodiments herein, the object is achieved by a method, performed by the first network node. The method is for supporting positioning of the wireless device in the wireless communication network. The first network node serves the wireless device. The first network node and the wireless device are comprised in the wireless communication network. The first network node receives from the second network node comprised in the wireless communication network, an obtained TA value obtained by the second network node. The obtained TA value is indicative of the TA in relation to the wireless device and the second network node. The obtained TA value is received in association with a) the cell identifier identifying the cell provided by the second network node and that the access has been made to, and b) the device identifier identifying the wireless device, that the TA value relates to. The first network node provides, to the first positioning node comprised in the wireless communication network, the first positioning node being associated with the first network node, the received TA value, in association with the cell identifier, and the device identifier.

According to a fourth aspect of embodiments herein, the object is achieved by the wireless device configured to support positioning of the wireless device in the wireless communication network. The wireless device is configured to be comprised in the wireless communication network. The wireless device is configured to receive, from the first network node, the positioning request. The wireless device is configured to be served in the wireless communication network by the first network node when receiving the positioning request. The positioning request is configured to request the wireless device to initiate the multilateration positioning procedure. The positioning request is configured to be sent by the first positioning node associated with the first network node and comprised in the wireless communication network. And, in response to the received positioning request, the wireless device is further configured to send, to the second network node configured to be comprised in the wireless communication network, the positioning access request. The positioning access request is configured to indicate that the access request relates to the multilateration positioning and configured to request the second network node to estimate the TA for the wireless device. The wireless device is further configured to send, to the second network node, the device identifier configured to be obtained, and the source identifier configured to be obtained. The device identifier configured to be obtained is configured to identify the wireless device, and the source identifier configured to be obtained is configured to identify the first network node.

According to a fifth aspect of embodiments herein, the object is achieved by the second network node configured to support positioning of the wireless device in the wireless communication network. The second network node and the wireless device are configured to be comprised in the wireless communication network. The second network node is further configured to receive, from the wireless device, the positioning access request. The positioning access request is configured to indicate that the access request relates to the multilateration positioning, and is configured to request the second network node to estimate the TA for the wireless device. The second network node is further configured to obtain, based on the positioning access request configured to be received, the TA value indicative of the TA in relation to the wireless device and the second network node. The second network node is further configured to receive, from the wireless device, the device identifier configured to identify the wireless device, and the source identifier configured to identify the first network node configured to serve the wireless device in the wireless communications network. The second network node is further configured to provide, using the source identifier configured to be received and the device identifier configured to be received, the TA value configured to be obtained in association with the cell identifier. The cell identifier is configured to identify the cell configured to be provided by the second network node, to at least one of: the first network node, and the first positioning node associated with the first network node.

According to a sixth aspect of embodiments herein, the object is achieved by the first network node configured to support positioning of the wireless device in the wireless communication network. The first network node is configured to serve the wireless device. The first network node and the wireless device are configured to be comprised in the wireless communication network. The first network node is further configured to receive from the second network node configured to be comprised in the wireless communication network the TA value configured to be obtained by the second network node. The TA value configured to be obtained is indicative of the TA in relation to the wireless device and the second network node. The TA value configured to be obtained is configured to be received in association with a) the cell identifier configured to identify the cell configured to be provided by the second network node and that the access has been made to, and b) the device identifier configured to identify the wireless device 120, that the TA value relates to. The first network node is further configured to provide, to the first positioning node configured to be comprised in the wireless communication network, the first positioning node being configured to be associated with the first network node, the TA value configured to be received, in association with the cell identifier, and the device identifier.

By the wireless device sending the positioning access request to the second network node, and the device identifier and the source identifier, the wireless device enables the second network node to provide the TA value in association with the cell identifier to the first network node or the first positioning node. The first network node is in turn enabled to provide the TA value to the first positioning node. Hence, in a multilateration procedure, a non-serving controller node such as the second network node is enabled, thanks to the embodiments herein, to know where to send the derived Timing advance information and corresponding cell identity for a Foreign BTS to the serving controller node, the first network node, which may then forward this information to the serving positioning node, i.e., the SMLC that triggered the positioning procedure. The use of one or more cells under control of one or more non-serving controller nodes may enable to maximize the accuracy of estimating the position of the wireless device as well as to minimize the set of cells that may be needed to obtain an estimation of the position of the wireless device. An enhanced accuracy of estimating the position of the wireless device, a more efficient use of the radio resources of the wireless communication network and an improved battery conservation of the wireless device may therefore be realized when TA information may be gathered by non-serving controller nodes.

BRIEF DESCRIPTION OF THE DRAWINGS

The various aspects of embodiments disclosed herein, including particular features and advantages thereof, will be readily understood from the following detailed description and the accompanying drawings, in which

FIG. 1 is a schematic representation illustrating an example of multilateration.

FIG. 2 is a schematic block diagram illustrating an example of a Multilateration procedure, according to existing methods.

FIG. 3 is a schematic block diagram illustrating another example of a Multilateration procedure, according to existing methods.

FIG. 4 is a schematic diagram illustrating an embodiment of a wireless communication network, according to embodiments herein.

FIG. 5 is a flowchart depicting a method in a wireless device, according to embodiments herein.

FIG. 6 is a flowchart depicting a method in a second network node, according to embodiments herein.

FIG. 7 is a flowchart depicting a method in a first network node, according to embodiments herein.

FIG. 8 illustrates schematically, in a combined signaling diagram and flowchart, various actions and relations in embodiments herein.

FIG. 9 is a schematic block diagram illustrating an embodiment of a wireless device, according to embodiments herein.

FIG. 10 is a schematic block diagram illustrating an embodiment of a second network node, according to embodiments herein.

FIG. 11 is a schematic block diagram illustrating an embodiment of a first network node, according to embodiments herein.

DETAILED DESCRIPTION

Figure 1:
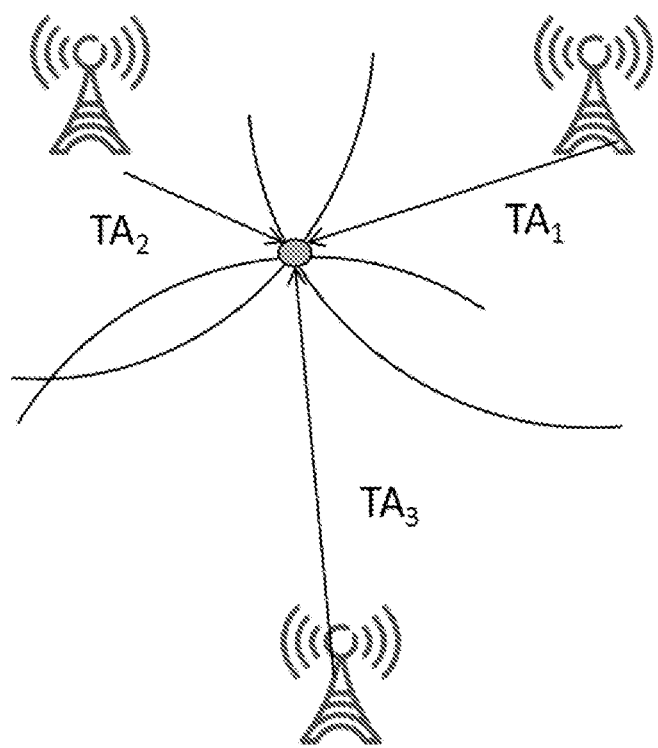
FIGS. 1-11 are shown, according to the following description.

Throughout the following description similar reference numerals may be used to denote similar elements, units, modules, circuits, nodes, parts, items or features, when applicable. In the Figures, features that appear only in some embodiments are typically indicated by dashed lines.

As part of a development towards embodiments herein, a problem in existing methods will first identified and discussed.

The problem may be summarized as that, according to existing methods more information, which may be useful for a location of a device with multilateration, may be collected by some of the nodes in the communications network, than the existing methods are currently enabled to handle. Therefore, existing methods lead to suboptimal location procedures and wasted energy, processing, and radio resources. This problem will now be explained in further detail, before the embodiments herein addressing this problem are presented.

For the purpose of simplifying the description the following definitions are used:

A Serving SMLC node may be understood as the SMLC node that may have sent the Radio Resource Location Services Protocol (RRLP) Multilateration Request to a device (MS).

A Serving BSS may be understood as the BSS associated with the serving and local BTSs, i.e., the BSS that may have context information for the Temporary Logical Link Identity (TLLI) corresponding to a MS for which the Multilateration procedure has been triggered.

A Non-serving BSS may be understood as a BSS associated with a Foreign BTS, i.e., a BSS that does not have context information for the TLLI corresponding to a MS for which the Multilateration procedure has been triggered.

Figure 2:
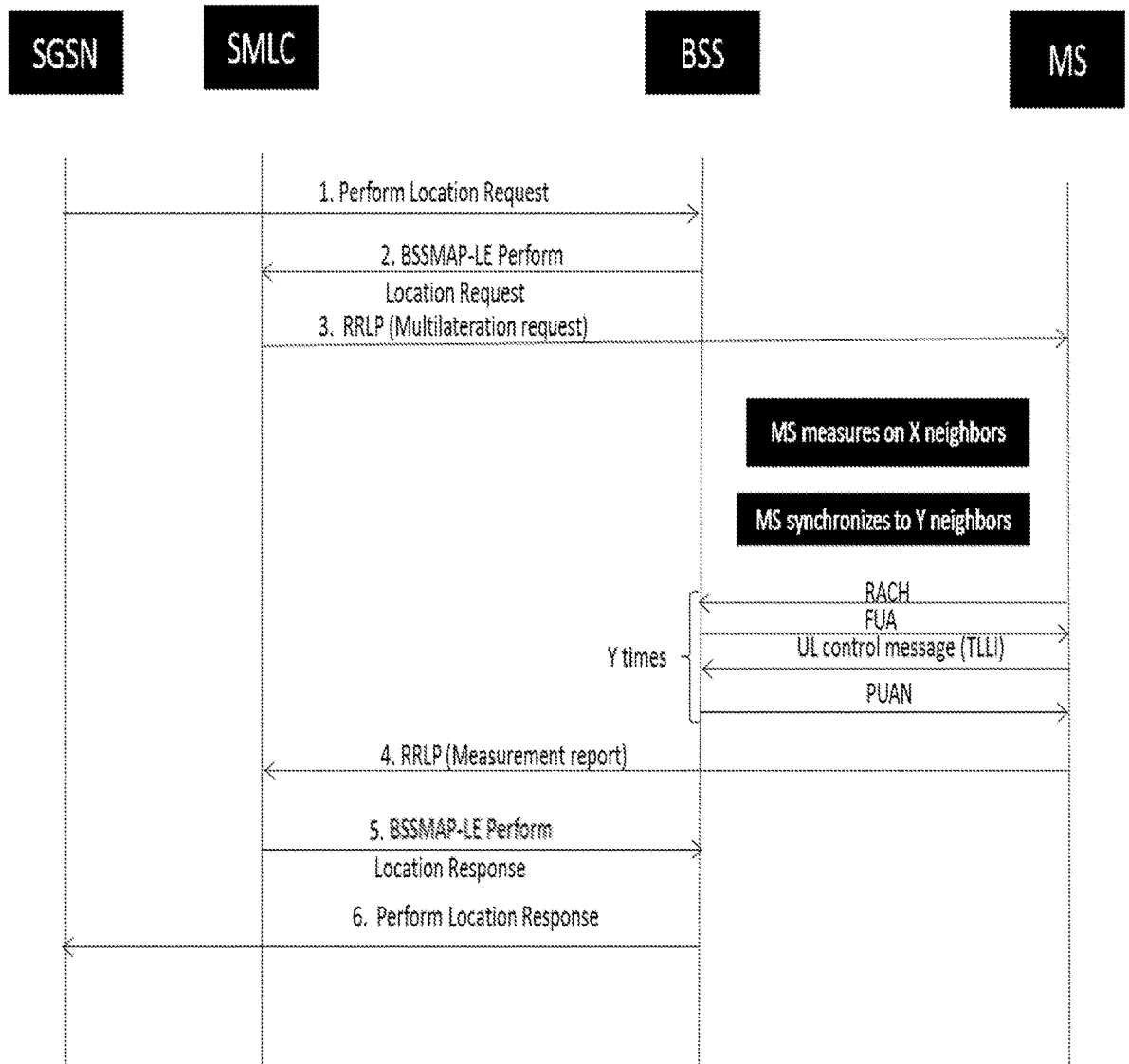

At the RAN6#1 meeting several options regarding the signaling and detailed procedure for the Multilateration procedure were discussed. On a high level, two options were discussed referred to as Network assisted method and MS autonomous method. In the network assisted method, the network may decide the base stations to be used for Multilateration, based on one or more measurement reports from the MS, while in the MS autonomous method, the MS may decide the cells to be used based on signal strength, see e.g. R6-160012. In FIG. 2, a proposed signaling for the MS autonomous method is illustrated. In step 1, the Serving GPRS Support Node (SGSN) sends a request to the BSS to perform a location request for the MS. The BSS, in step 2 sends a BSSMAP-LE Perform Location Request, as defined in 3GPP TS 49.031 v13.0.0, to the SMLC. In step 3, the SMLC sends a RRLP Multilateration request to the MS. The MS then performs measurements on a number X of neighbor BSs, and synchronizes to a number Y of neighbor BSs, which comprises sending a Random Access CHannel (RACH) message, receiving a Fixed Uplink Allocation (FUA), sending an UL control message with a TLLI, and receiving a Packet Uplink Acknowledgement/Negative acknowledgement (PUAN) in return. In step 4, the MS sends the Measurement report which includes cell Identifiers (IDs) and associated timing advance values to the SMLC node to be used for calculation of the position. In step 5, the SMLC sends a BSSMAP-LE Perform Location Response, as defined in 3GPP TS 49.031 v13.0.0, to the BSS. And finally, at step 6, the BSS sends a Perform Location response to the SGSN, comprising the estimated position of the wireless device indicated by the SGSN in the Perform Location Request sent in step 1.

Figure 3:
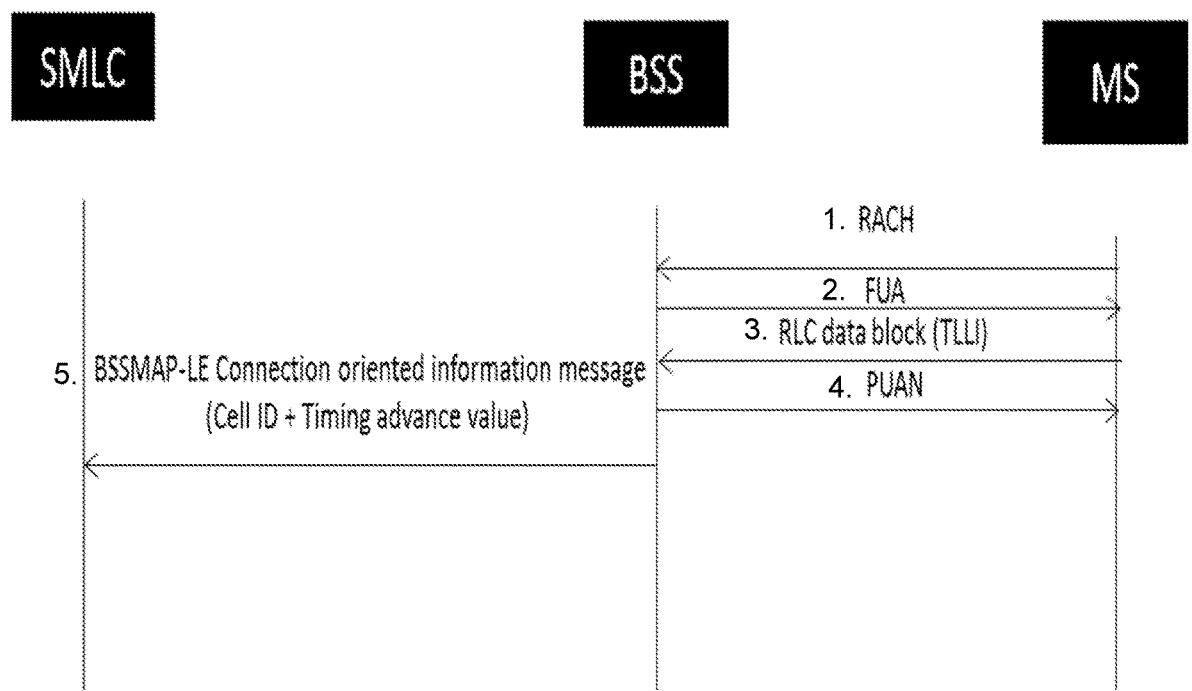

During the meeting, several optimizations were also discussed to reduce the power consumption of the device, see e.g. R6-160085, and in this context, it may be advantageous to eliminate step 4 in FIG. 2 in order to save the energy otherwise needed to transmit this report. This may be achieved by having the BSS collect the timing advance values and send them to the positioning node, and this was in fact proposed for the Network assisted method. One procedure to determine the timing Advance value and send it to the SMLC node is illustrated FIG. 3 for a serving BSS and e.g., an EC-GSM-IoT supporting device. FIG. 3 may thus be considered to illustrate a preferred timing advance determination and collection procedure for a Serving BSS. In a first step, the MS sends a RACH message to the BSS, and in a second step, it receives a FUA in response. In a third step, the MS sends a Radio Link Control (RLC) data block to the BSS comprising the TLLI, and in response, receives a PUAN at step 4. At step 5, the BSS sends a BSSMAP-LE Connection Oriented Information message, e.g., as defined in 3GPP TS 49.031 v13.0.0, to the SMLC, which comprises the Cell ID of the cell used by the MS when the TA value is estimated, and the TA value estimated by the BSS based on receiving the RACH message and the RLC data block.

It should be noted that the actual timing advance value estimation may be carried out by the BTS, and may be done on only the access burst in the first RACH message, or further refined using also the four normal bursts used to send the RLC data block carrying the TLLI on the uplink radio resources assigned by the Fixed Uplink Allocation (FUA). After the timing advance value may have been determined, that is, estimated, the BSS may in turn forward the timing advance value and Cell ID to the serving SMLC node, since it may already have a context associated with this TLLI, established when the BSS sent the SMLC a BSSMAP-LE Perform Location Request—see step 2 of FIG. 2—as a result of receiving the PERFORM-LOCATION-REQUEST PDU from the SGSN—see step 1 of FIG. 2—. The context allows the BSS to map the TLLI and associated Cell ID and timing advance value to a particular connection on the Lb interface. Expressed differently, the TLLI allows the BSS to identify a particular logical connection on the Lb interface, thereby allowing the serving SMLC node to determine the TLLI specific positioning procedure for which it receives an estimated TA value and associated Cell ID information—the cell used by the MS when the TA value is estimated—on this logical connection.

Figure 4:
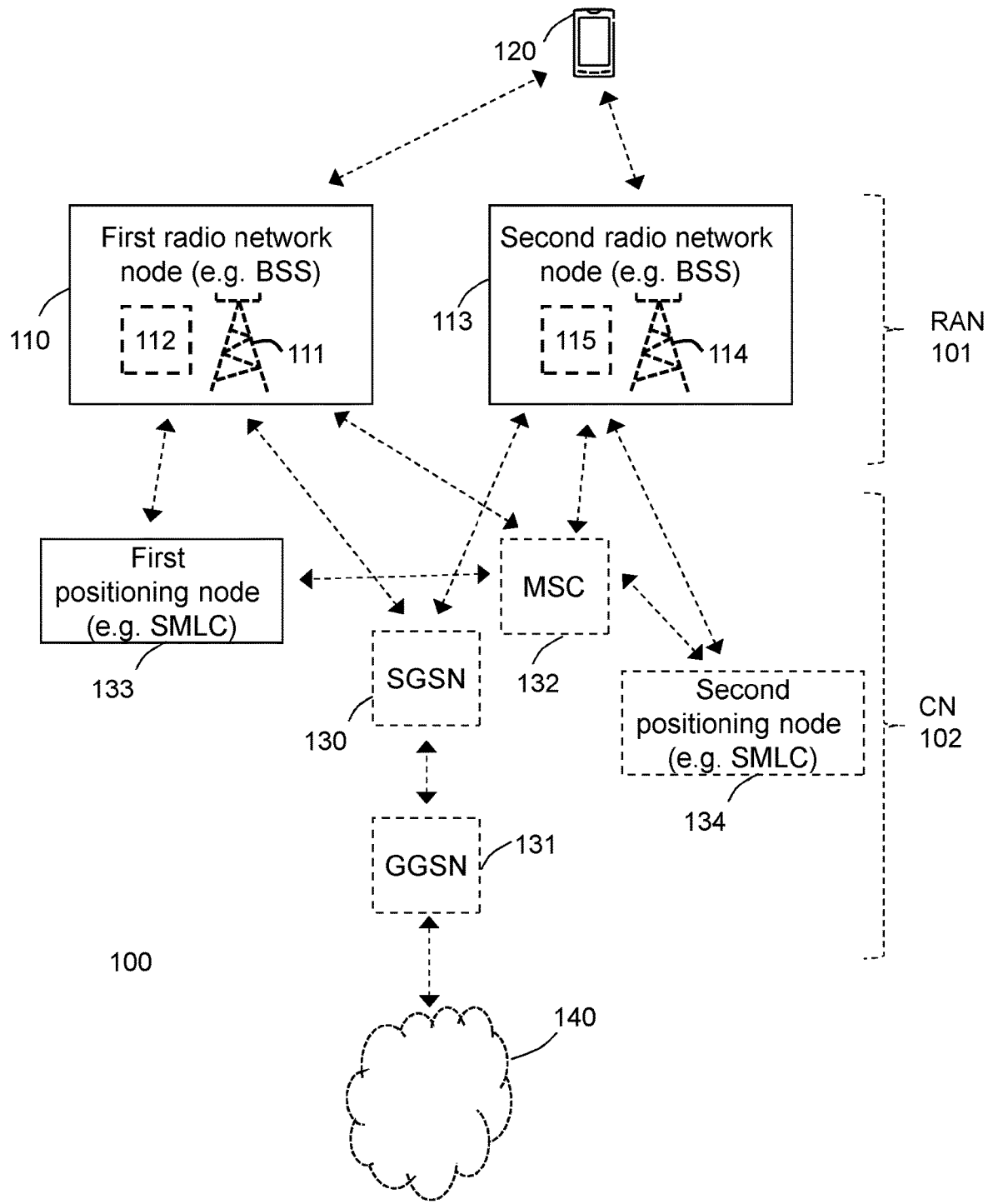

Location methods may be understood to need to associate the information gathered to an identifier for the wireless device for which location estimation is being attempted. In the examples of FIG. 2 and FIG. 4, such an identifier is the TLLI. Based on the above description, the proposed existing method to only include TLLI in the uplink message may not be satisfactory when any of the cells used during the positioning procedure belong to another, non-serving, BSS, or even worse, when the cells belong to another Routing area, as the non-serving BSS would not know which SMLC node to forward the derived timing advance information and associated Cell ID information to. In addition, it may also be pointed out that there is no explicit information sent to the MS which may allow it to determine if any given cell used as part of a given positioning procedure belongs to, i.e., is managed by, the serving BSS or to a non-serving BSS. In other words, unless other means are introduced to help the MS distinguish between cells belonging to a serving or non-serving BSS it would be advantageous for the MS to use the same procedure in both scenarios. To know whether a cell belongs to a serving or non-serving BSS may be useful because if the MS knows a cell belongs to the serving BSS, then it knows the serving BSS may have a context for its identity, which may have implications on the signalling which may be exchanged between them.

To summarize the foregoing, a problem with existing positioning solutions based on multilateration is that a non-serving controller node does not know where to send the derived Timing advance information and corresponding cell identity for a Foreign BTS used for a given positioning procedure performed for a particular device. In this case, the device is known to the non-serving controller node only by its radio interface identity, e.g., Temporary Logical Link Identity (TLLI), but since there is no context associated with the device radio interface identity within the non-serving controller node, it does not know how to relay the derived Timing advance information and corresponding cell identity to the serving positioning node.

Embodiments herein may be understood to address this identified problem. Embodiments herein may be understood in general to relate to methods and apparatus to support timing advance multilateration at controller node boundaries.

Embodiments will now be described more fully hereinafter with reference to the accompanying drawings, in which examples are shown. In the following, embodiments herein are illustrated by exemplary embodiments. It should be noted that these embodiments are not mutually exclusive.

Components from one embodiment may be tacitly assumed to be present in another embodiment and it will be obvious to a person skilled in the art how those components may be used in the other exemplary embodiments.

FIG. 4 is a schematic block diagram schematically depicting an example of a wireless communication network 100 in which embodiments herein may be implemented. The wireless communication network 100 is typically a telecommunication network or system, such as a cellular communication network that may be a GSM or a GSM based communication network, and should be supporting EC-GSM-IoT. It may comprise a RAN 101 part and a core network (CN) 102 part.

A first radio network node 110 is shown comprised in the wireless communication network 100 and may thus be located in the RAN 101. The first radio network node 110 may be or be comprised in a Base Station Subsystem (BSS), e.g. such as a BSS supporting GSM and/or GSM/EDGE, for example when the wireless communication network 100 is a GSM network or a GSM based communication network. The first network node 110 may be or comprise a base station 111, e.g. a Base Transceiver Station (BTS) of said BSS. The first network node 110 may further comprise a controlling node 112 of a base station, which may control one or more base stations, including e.g., the base station 111, and may be a Base Station Controller (BSC) of said BSS.

Also another, further, or second radio network node 113 is shown comprised in the wireless communication network 100 and may thus be located in the RAN 101. The second radio network node 113 may be or be comprised in a Base Station Subsystem (BSS), e.g. such supporting GSM and/or GSM/EDGE, for example when the wireless communication network 100 is a GSM network or a GSM based communication network. Also the second network node 113 may be or comprise a base station 114, e.g. a Base Transceiver Station (BTS) of said BSS. The second network node 113 may further comprise a controlling node 115 of a base station, which may control one or more base stations, including e.g. the base station 114, and may be a Base Station Controller (BSC) of said BSS.

The wireless communication network 100, e.g. the first network node 110 and/or the second network node 113 thereof, may serve and/or control and/or manage one or more devices, e.g. MSs, such as a wireless device 120 for wireless communication in the wireless communication network 100. The wireless device 120 may be of any type discussed herein, e.g., an MTC device, and/or support EC-GSM-IoT and/or operate according to EC-GSM-IoT.

Further, one or more network nodes are typically comprised in the wireless communication network 100 and in the CN 102, e.g. an SGSN 130, a Mobile Switching Centre (MSC) 132 and a Gateway GPRS Support Node (GGSN) 131 when the wireless communication network 100 is based on GSM.

Further, one or more positioning nodes, e.g. SMLCs, as also described elsewhere herein, may be comprised in the wireless communication network 100 and the CN 102. For example, there may be a first positioning node 133 associated with the first radio network node 110 and a second positioning node 134 associated with the second radio network node 113.

The CN 102 may further provide access for the wireless device 120 to an external network 140, e.g. the Internet. The communication device 120 may thus communicate via the RAN 101 and the CN 102 with the external network 140. When the wireless communication network 100 is a GSM network, or a GSM based communication network, the access to the external network is typically via a GGSN, such as the GGSN 131 illustrated in the figure.

The wireless communication network 100, including relevant nodes thereof, may support, and/or are configured to operate according to, Extended Coverage GSM (EC-GSM-IoT).

Attention is drawn to that FIG. 4 is only schematic and for exemplifying purpose and that not everything shown in the figure may be required for all embodiments herein, as should be evident to the skilled person. Also, a wireless communication network or networks that in reality correspond(s) to the wireless communication network 100 will typically comprise several further network nodes, such as base stations, etc., as realized by the skilled person, but which are not shown herein for the sake of simplifying.

Embodiments of methods and arrangements herein will now be described. Note that shown actions may be taken in any suitable order and/or be carried out fully or partly overlapping in time when this is possible and suitable. Dotted lines attempt to illustrate features that are not present in all embodiments. Any of the actions below may when suitable fully or partly involve and/or be initiated and/or be triggered by another, e.g. external, entity or entities, such as device and/or system, than what may actually be carrying out the actions. Such initiation may e.g. be triggered by said another entity in response to a request from the wireless communication network and/or in response to some event resulting from commutations and/or program code executing in said another entity or entities. Said another entity or entities may correspond to or be comprised in a so called computer cloud, or simply cloud, and/or communication with said another entity or entities may be accomplished by means of one or more cloud services.

Figure 5A:
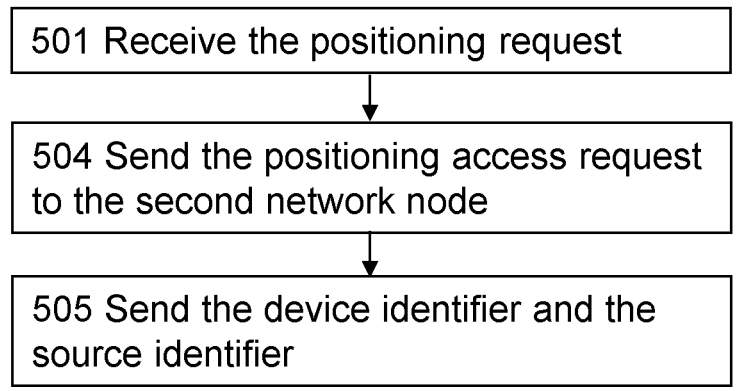
Figure 5B:
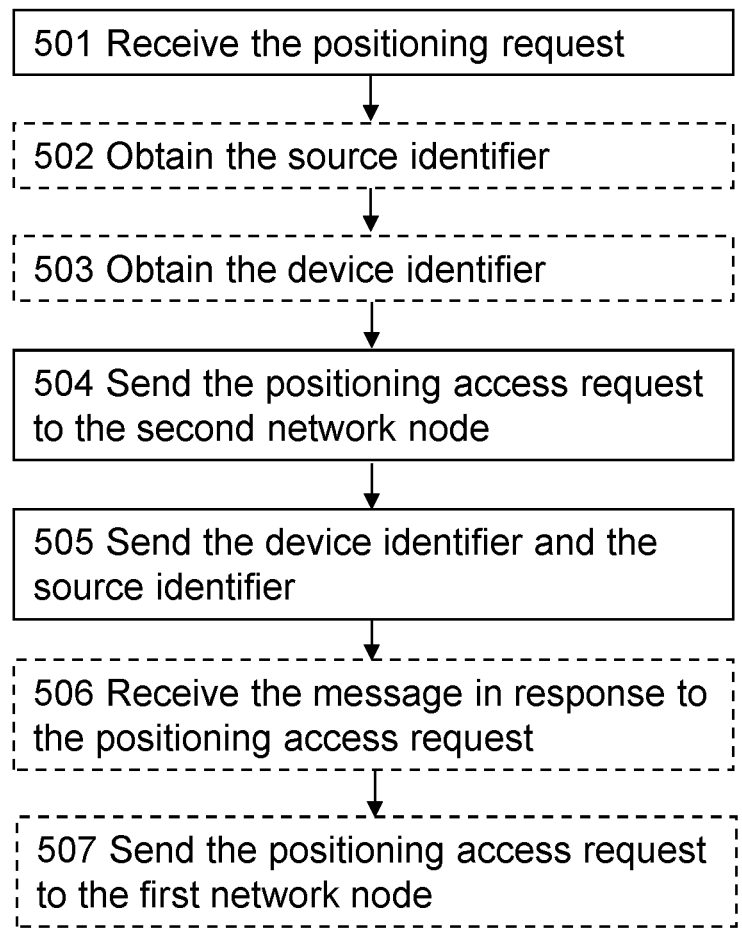

Embodiments of a method performed by the wireless device 120, for supporting positioning of the wireless device 120 in the wireless communication network 100, will now be described with reference to the flowchart depicted in FIG. 5. The wireless device 120 is comprised in the wireless communication network 100.

The first method comprises one or more of the following actions. In some embodiments, such as that depicted in FIG. 5a, only some actions may be performed, in this case, Action 501, Action 504 and Action 505. In some embodiments, such as that depicted in FIG. 5b, all the actions may be performed. One or more embodiments may be combined, where applicable. All possible combinations are not described to simplify the description.

Action 501

In order to support a positioning of the wireless device 120 in the wireless communication network 100, the positioning being based on multilateration, according to embodiments herein, in this Action 501, the wireless device 120 receives, from the first network node 110, a positioning request. The wireless device 120 is served in the wireless communication network 100 by the first network node 110 when receiving the positioning request. The positioning request requests the wireless device 120 to initiate a multilateration positioning procedure. The positioning request is sent by the first positioning node 133, which is associated with the first network node 110, and is comprised in the wireless communication network 100. That is, the positioning request may be sent by the first positioning node 133, e.g., a Serving Mobile Location Center (SMLC), via the first network node 110, e.g., a BSS, to the wireless device 120.

The request may be a multilateration request and may e.g., be based on a Radio Resource Location Services Protocol (RRLP).

The positioning request may indicate, e.g. identify, one or more cells and/or network nodes, typically radio network nodes that the wireless device 120 may need to involve in the positioning procedure, and/or that Timing Advance (TA) information may need to be retrieved from. The one or more network nodes may include one or more other, further network nodes than the first network node 110. These one or more further network nodes may herein be referred to as one or more other, or non-serving, network nodes to distinguish them from the first, or serving, network node 110. An example of such further network nodes is the second network node 113, which is used herein as an example of such a further network node. Any reference herein to the second network node 113 may be understood to equally apply to any other such further network node.

Herein, the first network node 110 is referred to as a serving network node and may be serving the wireless device 120 when the positing request is received and the positing procedure initiated, but it need not be serving the wireless device 120 during the entire method. The first positioning node 133 sending the positioning request, via the first network node 110, to the wireless device 120 may similarly be referred to as a serving positioning node.

Action 502

In this Action 502, the wireless device 120 may obtain a source identifier identifying the first network node 110. The source identifier may be typically obtained by being received from the first network node 110, e.g. in connection with that the wireless device 120 started to be served by the first serving network node 110, e.g. when connecting to the first network node 110, or at some later point. The identification may be direct or indirect, for example, the first network node 110 may be identified, at least partly, by a cell identifier identifying a cell provided by the first network node 110 and that the wireless device 120 may be being served in. Identification may be unique in the wireless communication network 100, or in a subarea thereof that may comprise relevant nodes, such as the other, further, or non-serving, network nodes mentioned below, and/or all nodes involved, or potentially involved, in the positioning procedure.

In some particular embodiments, the source identifier may be a Source Identity.

The source identifier may comprise an area identifier identifying an area in which the serving network node is located, e.g. a Location Area Code (LAC), and cell identifier, e.g. a Cell ID. That is, the source identifier may comprise an area identifier identifying an area in which the first network node 110 is located, and cell identifier information. The cell identifier information may identify a specific cell in that area.

The source identifier may further comprise a network identifier identifying the wireless communication network 100, or a part thereof, and may e.g. be a Public Land Mobile Network (PLMN) identifier that may comprise a Mobile Country Code (MCC) and Mobile Network Code (MNC).

Action 503

In this Action 503, the wireless device 120 may obtain a device identifier identifying the wireless device 120. The device identifier may be a temporary identifier, e.g. a Temporary Logical Link Identity (TLLI), identifying the wireless device 120.

Action 504

In response to the received positioning request in Action 501, the wireless device 120 sends, in this Action 504, to the second network node 113 comprised in the wireless communication network 100, a positioning access request indicating that the access request relates to a multilateration positioning, and requesting the second network node 113 to estimate a Timing Advance (TA) for the wireless device 120. That is, the wireless device 120 may be understood to implicitly also request the second network node 113 to estimate TA for the wireless device 120 by sending the positioning access request indicating that the access request relates to a multilateration positioning.

A positioning access request may be understood as an access request indicating, e.g., identifying, that the access request relates to positioning, e.g., multilateration. The positioning access requests may be typically sent on Random Access CHannels (RACHs), e.g. Extended Coverage (EC-) RACHs.

The wireless device 120 may also send in this Action 504, one or more positioning access requests, respectively, to each one of one or more other, further, or non-serving, network nodes, i.e. other than the first network node 110, typically radio network nodes, such as the second network node 113.

The one or more further network nodes may be network nodes indicated in the received positioning request, as mentioned above.

The positioning access request may enable and/or request a further network node receiving it to estimate TA for the device sending the positioning request, e.g. based on the positioning access request as such, or a corresponding burst and/or following burst(s), and provide a TA value accordingly.

Action 505

The wireless device 120, in this Action 505, sends to the second network node 113, the obtained device identifier and the obtained source identifier. The obtained device identifier identifies the wireless device 120, and the obtained source identifier identifies the first network node 110.

The obtained device identifier may be comprised in the positioning access request sent to the second network node 113, as described in Action 504.

In some embodiments, at least one of: the obtained device identifier and the obtained source identifier, may be sent in an uplink transmission subsequent to sending the positioning access request in Action 504.

In some particular embodiments, at least one of: the obtained device identifier and the obtained source identifier, may be sent comprised in one of: a) a Radio Link Control (RLC) data block, and b) an uplink control message.

For some examples, when sent subsequent to the positioning access request, the device identifier may be sent in, i.e. be comprised in, an uplink transmission subsequent to the positioning access request, e.g. be comprised in a data block, e.g. RLC data block, of a Temporary Block Flow (TBF) established in response to the access request.

For example, the device identifier may be comprised in a data block, e.g. RLC data block, when it is the TLLI.

It may be indicated in the positioning request, see Action 501, which of the one or more network nodes that a Short ID may and/or may need to be used for, and thus e.g., that supports Short ID, and/or which of these nodes TLLI may or should be used for. The Short ID may be an identifier of smaller size than the temporary identifier, e.g. TLLI. For example, if the TLLI is 32 bits, the Short ID may be 8 bits of fewer. The Short ID may also be temporary. The Short ID may be typically assigned to the wireless device 120 by the first positioning node 110 and may be comprised in the positioning request. It may e.g., be assumed that TLLI may and should be used for all and/or for those not indicated to support Short ID.

In a first group of examples, the positioning access request or an uplink transmission in response thereto, e.g. part of a TBF established in response to the access request such as an RLC data block sent using part of a TBF established in response to the access request, in addition to the device identifier, may also comprise the obtained source identifier identifying the serving network node. This may be the case when the device identifier is the TLLI. The device identifier and the source identifier may be sent in association with each other, e.g. together, such as in one and the same data structure, e.g. message and/or data block, e.g. a RLC data block. The data structure may be associated with an uplink transmission and/or part of a TBF, established in response to the positioning access request.

In a first example, when sent to the second network node 113, the device identifier in the form of a TLLI and the source identifier in the form of Source Identity may be comprised in a RLC data block that is sent to the second network node 113, e.g. using an uplink assignment received and/or on a TBF established, in response to the positioning access request.

In a second example, when sent to the second network node 113, i.e. a further network node other than the first network node 110, the device identifier e.g. in the form of a TLLI and the source identifier e.g. in the form of Source Identity may be comprised in an uplink control message that is sent to the second network node 113, in response to the positioning access request. The device identifier and the source identifier may then enable the second network node 113 to, e.g. via a core network, e.g. the CN 103, and one or more nodes thereof, e.g. a MSC, to provide the TA value estimated for the wireless device 120, via the first network node 110, to the first positioning node 133.

Hence, these examples of the first group enable a solution to the problem indicated above and thus provide an improvement with regard to positioning, such as multilateration, in a wireless communication network such as the wireless communication network 100. This is because, in contrast to the existing methods, embodiments herein enable the, non-serving, second network node 113 to know which node to address the estimated TA value to, as indicated by the source identifier, and which particular wireless device this is for, as indicated by the device identifier. As an example, the source identifier may consist of MCC+MNC+LAC+Cell ID, i.e., a total of 7 octets, in order to address the case where knowledge of PLMN ID (MCC+MNC) may be needed to forward the estimated TA value and associated Cell ID information for a given TLLI from a non-serving, second network node 113, to the first network node 110 using methods for uniquely routing information within a wireless communication network, e.g., the second network node 113 may route information to the first network node 110 via the MSC 132 using the source identifier information. The first network node 110 may then forward the TLLI, estimated TA value and associated Cell ID information to the first positioning node 133 using the logical connection that may already exist for the wireless device 120, corresponding to the TLLI.

Action 506

The wireless device 120, in this Action 506, may receive, from the second network node 113, in response to the sent positioning access request, a message that may be named an access grant message. The message may be typically received on an Access Grant CHannel (AGCH), e.g., an EC-AGCH.

In some examples, the access grant message may comprise the TA value provided by the second network node 113 and may be used by the wireless device 120 for transmitting information, e.g., a RLC data block, to the second network node 113. This may also apply to another further network node. The message may also comprise a cell identifier identifying the cell provided by the second network node 113 and that the access has been made to, although the wireless device 120 in some embodiments may already have obtained a cell identifier of this cell prior to sending the positioning request, e.g. when performing measurements to identify available cells.

In some particular examples, the message may also indicate that the Short ID is not sufficient and/or that a further or other device identifier, e.g. TLLI, may be required.

Action 507

In the particular examples, wherein the message may have also indicated that the Short ID is not sufficient and/or that a further or other device identifier, e.g. TLLI, may be required, the wireless device 120 may return to the serving cell and, in this Action 507, may send, in response to the received message, to the first network node 110, a positioning access request corresponding to the positioning access request described above, i.e. typically on a RACH, e.g. EC-RACH, etc., but this positioning access request may preferably exclude the Short ID. This may be understood as an Action 507a.

The wireless device 120 may then receive, from the first network node 110, in response to the positioning access request sent to the first network node 110, an uplink assignment, e.g. uplink TBF assignment, typically on an AGCH, e.g. an EC-AGCH. This may be understood as an Action 507b.

The wireless device 120 may then send to the first network node 110, in response to the to the positioning access request, e.g. using the uplink assignment, the other device identifier, e.g. TLLI, and the cell identifier, e.g. comprised in a data block, e.g. RLC data block. This may be understood as an Action 507c.

An advantage with the third subgroup, i.e. with sending the TLLI to the first network node 110 and not back to the second network node 113, or the further network node, may be that the coverage may typically be better for the first network node 110 that the wireless device 120 was served in when the positioning procedure was initiated, and hence energy may be saved.

It may further be realized that the end result for second group of examples, such as the first, second and third subgroup of examples, is the same as for the examples of the first group discussed above. Hence also the second group of examples may enable a solution to the problem of the existing methods discussed earlier, and may thus provide an improvement with regard to positioning, such as multilateration, in the wireless communication network 100.

In some embodiments, the wireless device 120 may be a mobile station, the first network node 110 may be a serving Base Station System (BSS), the second network node 113 may be a non-serving BSS, the first positioning node 133 may be a Serving Mobile Location Center (SMLC) node, and the wireless communication network 100 may operate over a Global System for Mobile communications (GSM) or an Enhanced Data rates for GSM Evolution (EDGE) network.

Embodiments of a method, performed by the second network node 113, for supporting positioning of the wireless device 120 in the wireless communication network 100, will now be described with reference to the flowchart depicted in FIG. 6. The second network node 113 and the wireless device 120 are comprised in the wireless communication network 100.

The second method comprises the following actions.

Action 601

In order to support the positioning of the wireless device 120 in the wireless communication network 100, the positioning being based on multilateration, according to embodiments herein, in this Action 601, the second network node 113 receives, from the wireless device 120, the positioning access request, sent by the wireless device 120 in Action 504. The positioning access request indicates that the access request relates to a multilateration positioning, and requests the second network node 113 to estimate a Timing Advance (TA) for the wireless device 120.

Action 602

In this Action 602, the second network node 113 obtains, based on the received positioning access request, a TA value indicative of a TA in relation to the wireless device 120 and the second network node 113, that is indicative of a distance there between. The TA value may be understood to e.g., correspond to a TA estimation. It may be understood that the second network node 113 obtains the TA value based at least on the received positioning access request. Also, it may be understood that TA value may be indicative of the TA in relation to the wireless device 120 and a cell provided by the second network node 113.

The TA, e.g. TA estimation, may be obtained in response to and/or based on the received positioning access request, and/or based on a corresponding burst and/or burst(s) from the wireless device 120 following in response to the received positioning access request, e.g. after the second network node 113 may have granted access and/or provided the uplink assignment, e.g. an uplink TBF assignment to the wireless device 120.

Action 603

In this Action 603, the second network node 113 receives, from the wireless device 120, the device identifier identifying the wireless device 120, and the source identifier identifying the first network node 110 serving the wireless device 120 in the wireless communications network 100.

Action 604

The second network node 113, in this Action 604, provides, using the received source identifier and the received device identifier, the obtained TA value in association with the cell identifier identifying the cell provided by the second network node 113, to at least one of: the first network node 110, and the first positioning node 133 associated with the first network node 110. It may be understood that the cell identifier identifies the cell provided by the second network node 113 for which the TA value was obtained. The provision may be typically made via a core network, e.g. the CN 102, e.g. via one or more core network nodes, e.g. the MSC 132, so that it may reach the first network node 110. The first network 110 may then send the TA value, typically with the associated cell identifier, and/or network node identifier, to the first positioning node 133.

The obtained TA value may also be provided in association with a network node identifier, identifying the second network node 113.

At least one of: the device identifier and the source identifier, may be received in an uplink transmission subsequent to receiving the positioning access request.

In some embodiments, at least one of: the device identifier and the source identifier, may be received comprised in one of: a) the RLC data block, and b) the uplink control message described earlier.

Also as described earlier, in some embodiments, the device identifier may be a Temporary Logical Link Identity, TLLI.

The source identifier may comprise the area identifier identifying the area in which the first network node 110 is located, and the cell identifier information. The cell identifier information may identify a specific cell in that area.

In some embodiments, the source identifier may be a Source Identity.

In some embodiments, the wireless device 120 may be a mobile station, the first network node 110 may be a serving Base Station System (BSS), the second network node 113 may be a non-serving BSS, the first positioning node 133 may be a Serving Mobile Location Center (SMLC) node, and the wireless communication network 100 may operate over a Global System for Mobile communications (GSM) or an Enhanced Data rates for GSM Evolution (EDGE) network.

Figure 7A:
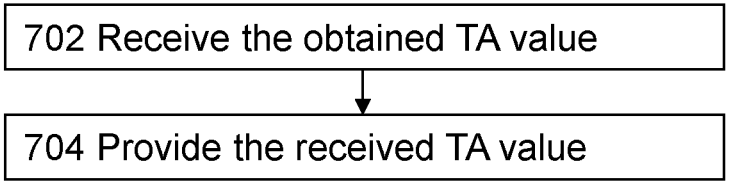

Embodiments of a method, performed by the first network node 110, for supporting positioning of the wireless device 120 in the wireless communication network 100, will now be described with reference to the flowchart depicted in FIG. 7. The first network node 110 serves the wireless device 120, as described before. The first network node 110 and the wireless device 120 are comprised in the wireless communication network 100.

The second method comprises one or more of the following actions. In some embodiments, such as that depicted in FIG. 7a, only some actions may be performed, in this case, Action 702 and Action 704. In some embodiments, such as that depicted in FIG. 7b, all the actions may be performed. One or more embodiments may be combined, where applicable. All possible combinations are not described to simplify the description.

Action 701

In order to support the positioning of the wireless device 120 in the wireless communication network 100, the positioning being based on multilateration, according to embodiments herein, in this Action 701, the first network node 110 may send, such as forward, from the first positioning node 133, the positioning request to the wireless device 120. The positioning access request may be as described above for the first method in Action 501.

Action 702

In this Action 702, the first network node 110 receives from the second network node 113 comprised in the wireless communication network 100, the obtained TA value obtained by the second network node 113. The obtained TA value is indicative of the TA in relation to the wireless device 120 and the second network node 113. The obtained TA value is received in association with a) the cell identifier identifying the cell provided by the second network node 113 and that the access has been made to, and b) the device identifier identifying the wireless device 120, that the TA value relates to. The receipt may be via a core network, e.g. the CN 102, e.g. via the MSC 132.

The first network node 110 may then send, i.e. forward, the obtained TA value, typically in association with the cell identifier, and/or network node identifier, and/or the device identifier, to the first positioning node 133.

It may be understood that the obtained TA value is indicative of the TA in relation to the wireless device 120 and the second network node 113 in that it may be indicative of the cell used for performing the positioning procedure wherein the cell is managed by the second network node 113.

The device identifier may be the TLLI.

Action 703

In this Action 703, the first network node 110 may receives, from the wireless device 120, the positioning access request. The positioning access request may be the positioning access request described above in Action 507b. The first network node 110 may respond to this positioning access request as also indicated in connection with Action 507b. As a result, the first network node 110 may receive the TA value etc., that may be in association with corresponding information as described above for Action 604.

Figure 7B:
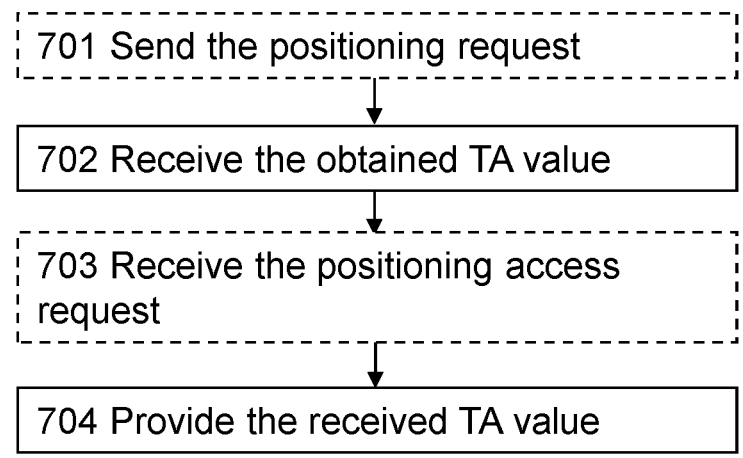

It may be understood that that the obtaining of the TA value in Action 702 of FIG. 7b may be performed as the positioning access request of Action 703 may be being received, that is, they may not occur as two separate and distinct Actions.

Action 704

The first network node 110, in this Action 704, provides, to the first positioning node 133 comprised in the wireless communication network 100, the first positioning node 133 being associated with the first network node 110, the received TA value, in association with the cell identifier, and the device identifier. The first network node 110 may also provide the received TA value in association with the network node identifier discussed earlier.

In some embodiments, the wireless device 120 may be a mobile station, the first network node 110 may be a serving Base Station System (BSS), the second network node 113 may be a non-serving BSS, the first positioning node 133 may be a Serving Mobile Location Center (SMLC) node, and the wireless communication network 100 may operate over a Global System for Mobile communications (GSM) or an Enhanced Data rates for GSM Evolution (EDGE) network.

Figure 8:
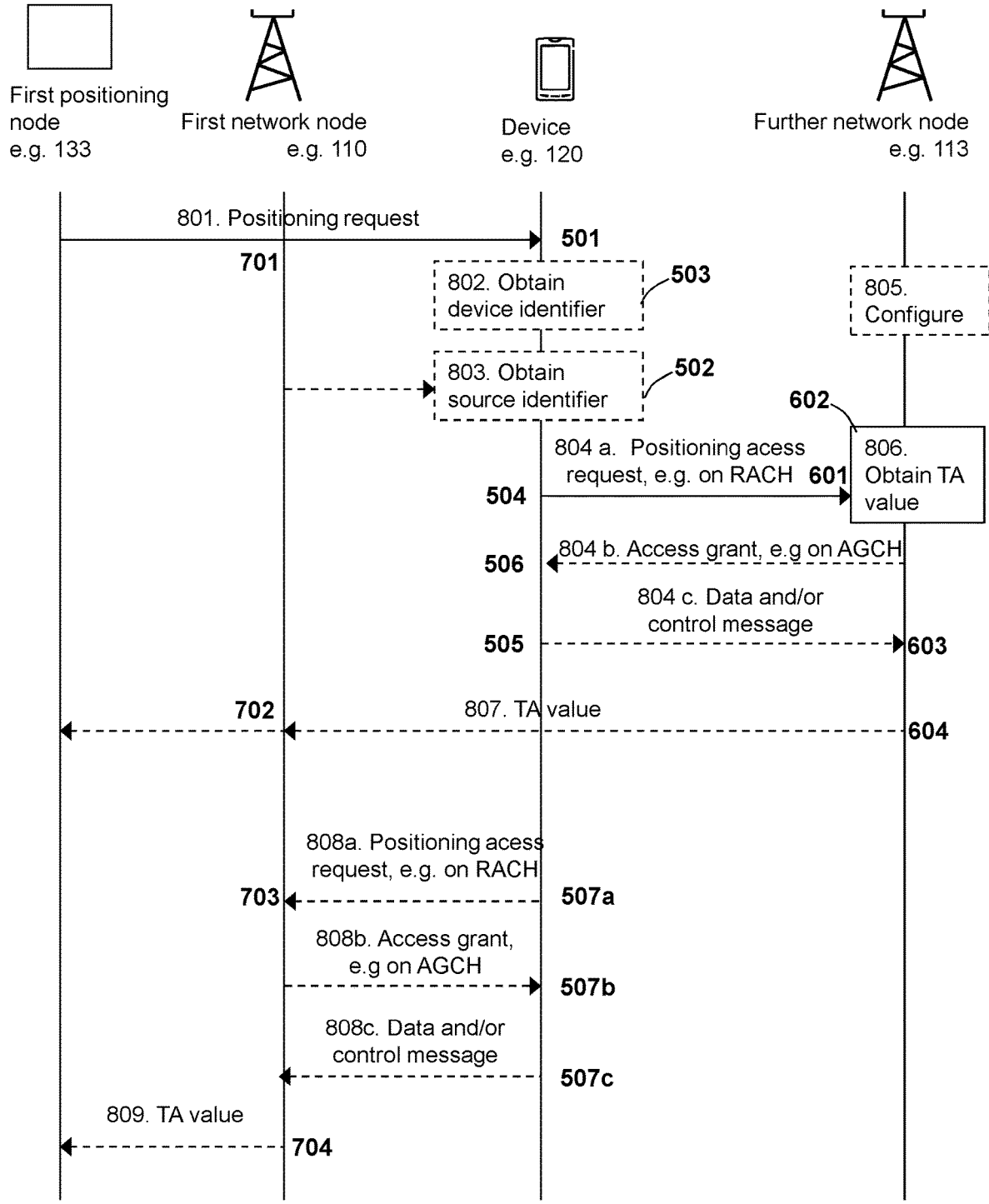

FIG. 8 is a combined signaling diagram and flowchart for illustrating some embodiments herein. In particular, FIG. 8 illustrates a particular non-limiting example of how the first positioning node 133, the first network node 110, the wireless device 120 and the further network node 113 may interact, according to embodiments herein, as described in relation to FIG. 5, FIG. 6 and FIG. 7. The reference numbers corresponding to the Actions described earlier for the respective nodes, are indicated in FIG. 8 in bold numbers, and therefore the actions will not be described again in relation to this Figure. The actions in this example are performed in the order depicted with the series of numbers starting with 8, as numbered. Note that as indicated above, the order of the actions may be performed differently than that described. Action 805, which has not been described before refers to a configuration performed by the second network node 113, whereby the second network node 113 may be configured to perform the routing of TLLI, estimated TA value for that TLLI and Cell identity of the cell used for estimating TA to the first network node 110, without the wireless device 120 sending Source Identity information to it, using the assigned uplink radio resources. In some examples, not depicted in FIG. 8, the obtaining of the TA value in Action 806 may also be performed using the information transmitted to the second network node 113 in action 804c.

Embodiments below will be exemplified in detail with GSM/EDGE as the wireless communication network 100. The core network node will be exemplified with a Serving GPRS Support Node (SGSN), but generally it may be another core network node serving the wireless device 120 as well. For example, for NB-IoT, the applicable core network node may also be a Mobility Management Entity (MME). Each of the first network node 110 and the second network node 113, each as a radio access network node, e.g., controller node, is exemplified with a BSS, and the wireless device 120 will be exemplified with a mobile station, sometimes also referred to as the device. The first positioning node 133 will be exemplified with an SMLC node but may, e.g., for NB-IoT, be an E-SMLC node.

In a general context, the embodiments disclosed herein may be also applicable to other standards such as NB-IoT, LTE and UMTS implementing Multilateration, were the source identity of the serving controller node, i.e., the BSS managing the Serving or local BTS, may need to be provided to the non-serving controller node, e.g., the BSS managing a Foreign BTS, so that the derived timing advance and corresponding cell identity may be relayed to the serving controller node, and then forwarded to the serving SMLC. Further details may be found also in e.g., 3GPP TS 44.060, v13.3.1.

In a first set of examples, as described above in Action 505, it is described herein to, in addition to the TLLI, also include the Source Identity of the first network node 110, the Serving BSS, in the RLC data block transmitted on an uplink TBF established in response to an access request indicating Multilateration. In order for the any of the first network node 110 and the second network node 113 to also extract the Source identity from the uplink RLC data block, the wireless device 120 may use a reserved length indicator, e.g., a length indicator of value 122. The length indicators may be used to delimit upper layer Protocol Data Unit (PDU), but may also be used to indicate the presence of additional information within the RLC data block. One example is the length indicator 125, which indicates the presence of dynamic timeslot reduction control information which may need to be included after the last Upper Layer PDU, see e.g. 3GPP TS 44.060 v13.3.1. In the case of Multilateration, a Length Indicator of value 122 may be used by the wireless device 120 to indicate the presence of the "Source Identity" field in the 4 octets immediately following the Length Indicator. The assumption of using 4 octets for the Source Identity field may be seen as valid if it is always sufficient to provide 2 octets of Location Area Code (LAC) and 2 octets of Cell ID information for the source identity, i.e., if it may be assumed that only cells belonging to the same PLMN are used for positioning. However, the "Source Identity" field may alternatively consist of MCC+MNC+LAC+Cell ID, i.e., a total of 7 octets, in order to address the case where knowledge of PLMN ID, that is, MCC+MNC, may typically be needed to forward the derived timing advance information and associated Cell ID information from a non-serving BSS, such as the second network node 113, to the serving BSS, that is, the first network node 110.

An example of a procedure for the second network node 113 to forward the derived timing advance value and corresponding cell identity to the first network node 110, which may then send it directly to the serving SMLC node, that is, the first positioning node 133, may then be as follows.

1. After receiving a Positioning Access Request and sending the wireless device 120 an assignment message, e.g., Access Grant, assigning uplink radio resources, the second network node 113 receives an RLC data block within a cell used by the wireless device 120 during a given Multilateration procedure wherein the RLC data block includes both "TLLI" and "Source Identity" information.

2. As the second network node 113 has no context for the indicated "TLLI", it realizes it is a non-serving BSS and sends the MSC a "BSSAP-LE CONNECTIONLESS INFORMATION" message containing "TLLI", "MULTI-LATERATION TIMING ADVANCE" and "CELL IDENTIFER" information.

3. The MSC then forwards the "BSSAP-LE CONNECTIONLESS INFORMATION" message to the first network node 110, the serving BSS, identified by the "Network Element Identity (target)" IE in the "BSSAP-LE CONNECTIONLESS INFORMATION" message, i.e., the "Network Element Identity (target)" IE may be configured according to the "Source Identity" information the non-serving BSS received in the RLC data block.

4. The first network node 110 uses the "TLLI" information in the "BSSAP-LE CONNECTIONLESS INFORMATION" message to identify the wireless device 120 context/BSSMAP-LE Connection and then sends its default SMLC a "BSSMAP-LE CONNECTION ORIENTED INFORMATION" message containing "MULTILATERATION TIMING ADVANCE" and "CELL IDENTIFER" information.

In a second set of examples, the wireless device 120 may also include the TLLI, and the Source Identity of the Serving BSS in a new uplink control message, transmitted to the second network node 113 using the assigned uplink radio resources. In addition, the assignment procedure may be modified to allow for the wireless device 120 to send an uplink control message as response to the assignment message, thereby eliminating the need for the second network node 113 to acknowledge reception of the new uplink control message. The procedure for the second network node 113 to forward the derived timing advance value to the first network node 110, which then sends it directly to the first positioning node 133, the serving SMLC node, may be the same as in the first set of examples.

In a third set of examples the second network node 113 may be configured with information, as indicated by Action 805 in FIG. 8, such that for a Multilateration procedure for which it has no current context it may be able to forward the derived timing advance value and Cell ID to the first network node 110, as serving BSS, for further forwarding to the second network node 113. What may typically be needed in this case is for all cells along BSS boundaries to be pre-configured with the ID, e.g. Location Area Code+Cell Identity, for any cell managed by the BSS on the other side of this boundary whenever the Multilateration procedure is supported. The advantage with this approach is that there are no standards impacts but it may require manual configuration and updates when the wireless communication network 100 may be reconfigured. The procedure for the second network node 113 to forward the derived timing advance value to first network node 110, which then may send it directly to the first positioning node 133 may be the same as in the first set of examples.

Hence, according to embodiments herein, new functionality may be added wherein the wireless device 120 may provide the non-serving controller node with Source Identity information that may be used to relay derived Timing advance information and corresponding cell identity to the serving controller node, which may then forward the information to the serving positioning node, as part of a positioning (Multilateration) procedure.

Advantages with the embodiments discussed above and herein is e.g., that non-serving controller nodes, e.g., BSS, eNB, RNCs, will be able to relay derived timing advance information and corresponding cell identity to the serving controller node, which may then forward this information to the serving positioning node, i.e., the SMLC that triggered the positioning procedure.

Figure 9:
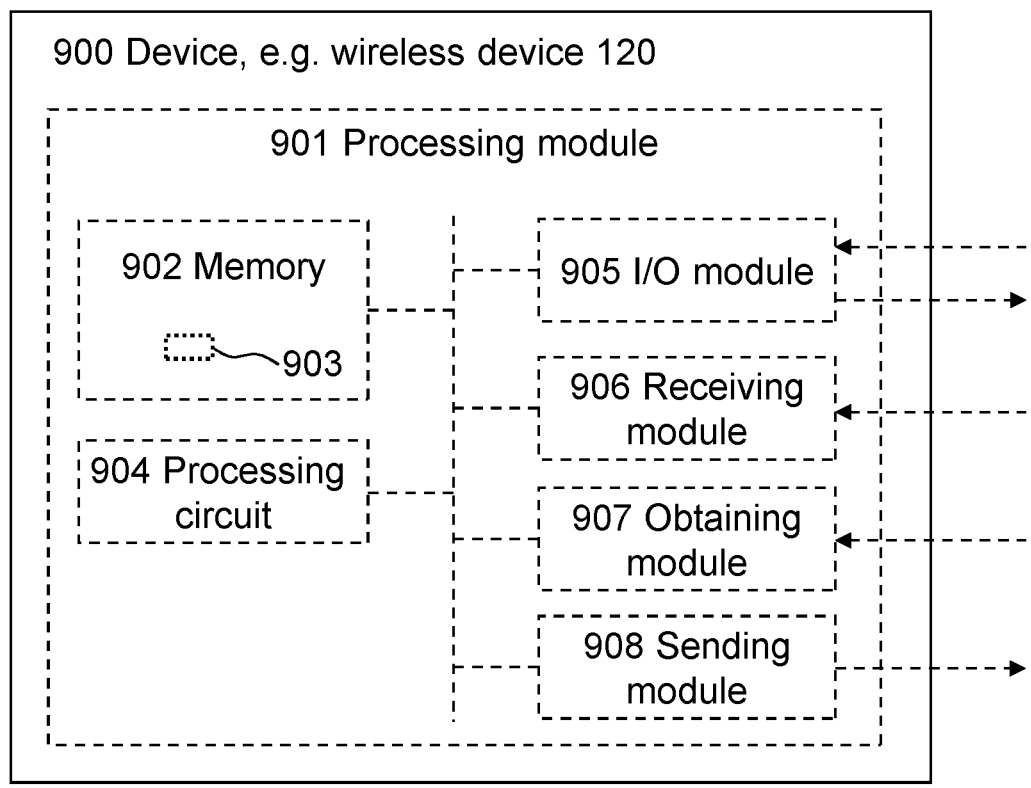

FIG. 9 is a schematic block diagram for illustrating embodiments of a device 900, that may be the wireless device 120, and how the wireless device 120 may be configured to perform the methods and/or one or more actions described herein relating to FIG. 5. The description herein of the device 900 will be made in reference to the wireless device 120. However, any description of the wireless device 120 may be understood to equally apply to the device 900.

Accordingly, the wireless device 120 is configured to support positioning of the wireless device 120 in the wireless communication network 100. The wireless device 120 is configured to be comprised in the wireless communication network 100.

Hence, the wireless device 120 may comprise:

A processing module 901, such as a means, one or more hardware modules, including e.g. one or more processors, and/or one or more software modules for performing said methods and/or actions.

A memory 902, which may comprise, such as contain or store, a computer program 903. The computer program 903 comprises 'instructions' or 'code' directly or indirectly executable by the wireless device 120 so that it performs the said methods and/or actions. The memory 902 may comprise one or more memory units and may be further be arranged to store data, such as configurations and/or applications involved in or for performing functions and actions of embodiments herein.

A processing circuit 904, as an exemplifying hardware module and may comprise or correspond to one or more processors. In some embodiments, the processing module 901 may comprise, e.g. 'is embodied in the form of' or 'realized by' the processing circuit 904. In these embodiments, the memory 902 may comprise the computer program 903 executable by the processing circuit 904, whereby the wireless device 120 comprising it is operative, or configured, to perform said method and/or actions. The computer program 903, comprises instructions which, when executed on at least one processing circuit 904, cause the at least one processing circuit 904 to carry out the method according to FIG. 5.

An Input/Output (I/O) module 905, configured to be involved in, e.g. by performing, any communication to and/or from other units and/or nodes, such as sending and/or receiving information to and/or from other external nodes or devices. The I/O module may be exemplified by an obtaining, e.g. receiving, module and/or a sending module, when applicable.

The wireless device 120 may also comprise other exemplifying hardware and/or software module(s) as may have been described elsewhere in the present disclosure, which module(s) may be fully or partly implemented by the processing circuit 904. For example, the wireless device 120 may further comprise a receiving module 706, an obtaining module 907 and/or a sending module 908.

Hence, the wireless device 120 and/or the processing module 901 and/or the processing circuit 904 and/or the I/O module 905 and/or the receiving module 906 is operative, or configured, to receive, from the first network node 110, the positioning request. The wireless device 120 is configured to be served in the wireless communication network 100 by the first network node 110 when receiving the positioning request. The positioning request is configured to request the wireless device 120 to initiate a multilateration positioning procedure. The positioning request is configured to be sent by the first positioning node 133 associated with the first network node 110 and comprised in the wireless communication network 100.

The wireless device 120 and/or the processing module 901 and/or the processing circuit 904 and/or the I/O module 905 and/or the sending module 908 is operative, or configured, to, in response to the received positioning request, send, to the second network node 113 configured to be comprised in the wireless communication network 100, the positioning access request configured to indicate that the access request relates to the multilateration positioning and configured to request the second network node 113 to estimate the TA for the wireless device 120.

The wireless device 120 and/or the processing module 901 and/or the processing circuit 904 and/or the I/O module 905 and/or the sending module 908 is operative, or configured, to send, to the second network node 113, the device identifier configured to be obtained, and the source identifier configured to be obtained, the device identifier configured to be obtained being configured to identify the wireless device 120, and the source identifier configured to be obtained being configured to identify the first network node 110.

The wireless device 120 and/or the processing module 901 and/or the processing circuit 904 and/or the I/O module 905 and/or the obtaining module 907 may be operative, or configured, to, perform Action 502.

The wireless device 120 and/or the processing module 901 and/or the processing circuit 904 and/or the I/O module 905 and/or the obtaining module 907 may be operative, or configured, to perform Action 503.

The wireless device 120 and/or the processing module 901 and/or the processing circuit 904 and/or the I/O module 905 and/or the receiving module 906 may be operative, or configured, to perform Action 506.

The wireless device 120 and/or the processing module 901 and/or the processing circuit 904 and/or the I/O module 905 and/or the sending module 908 may be operative, or configured, to perform Action 507.

At least one of: the obtained device identifier and the obtained source identifier, may be configured to be sent in the uplink transmission subsequent to sending the positioning access request.

In some embodiments, at least one of: the obtained device identifier and the obtained source identifier, may be configured to be sent comprised in one of: a) the RLC data block, and b) the uplink control message.

The device identifier may be the TLLI.

The source identifier may comprise the area identifier configured to identify the area in which the first network node 110 is located, and cell identifier information.

In some embodiments, the source identifier may be a Source Identity.

In some embodiments, the wireless device 120 is a mobile station, the first network node 110 is a serving Base Station System, BSS, the second network node 113 is a non-serving BSS, the first positioning node 133 is an SMLC node, and the wireless communication network 100 is configured to operate over a Global System for Mobile communications, GSM or an Enhanced Data rates for GSM Evolution, EDGE, network.

Figure 6:
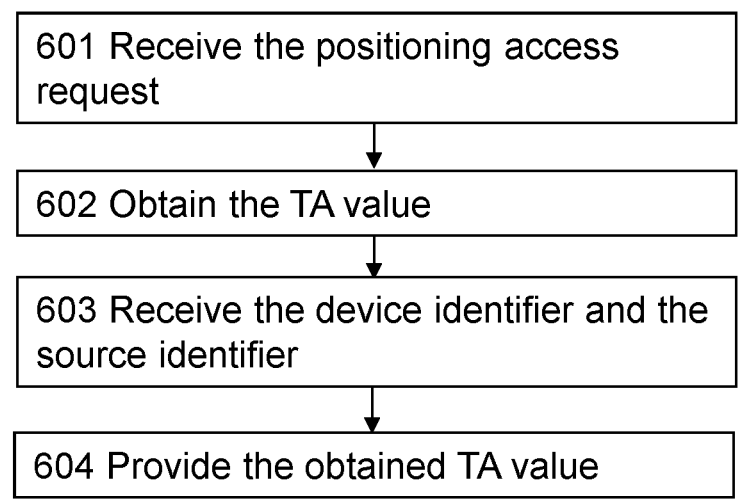
Figure 10:
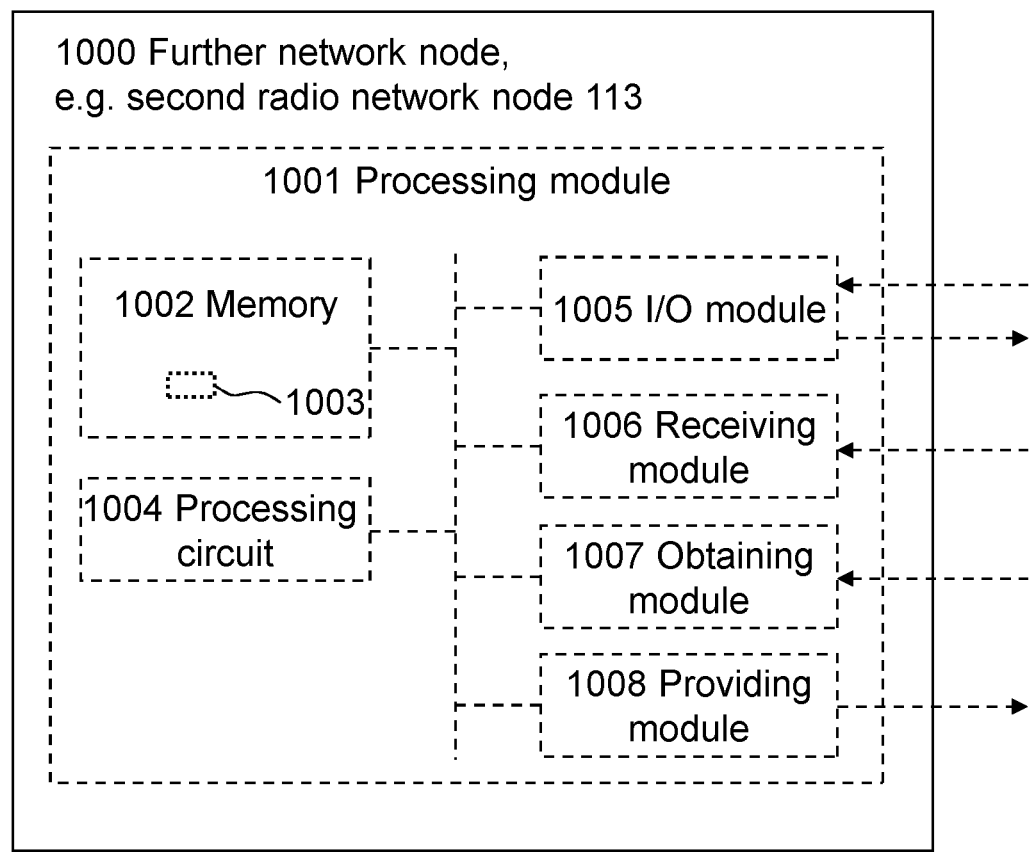

FIG. 10 is a schematic block diagram for illustrating embodiments of a further network node 1000 that may be the second radio network node 113, and how the second network node 113 may be configured to perform the methods and/or one or more actions described herein e.g. relating to FIG. 6.

The description herein of the further network node 1000 will be made in reference to the second network node 113. However, any description of the second network node 113 may be understood to equally apply to the further network node 1000.

Accordingly, the second network node 113 is configured to support positioning of the wireless device 120 in the wireless communication network 100. The second network node 113 and the wireless device 120 are configured to be comprised in the wireless communication network 100.

Hence, the second network node 113 may comprise:

A processing module 1001, such as a means, one or more hardware modules, including e.g. one or more processors, and/or one or more software modules for performing said methods and/or actions.

A memory 1002, which may comprise, such as contain or store, a computer program 1003. The computer program 1003 comprises 'instructions' or 'code' directly or indirectly executable by the second network node 113 so that it performs the said methods and/or actions. The memory 1002 may comprise one or more memory units and may be further be arranged to store data, such as configurations and/or applications involved in or for performing functions and actions of embodiments herein.

A processing circuit 1004, as an exemplifying hardware module and may comprise or correspond to one or more processors. In some embodiments, the processing module 1001 may comprise, e.g. 'is embodied in the form of' or 'realized by' the processing circuit 1004. In these embodiments, the memory 1002 may comprise the computer program 1003 executable by the processing circuit 1004, whereby the second network node 113 comprising it is operative, or configured, to perform said method and/or actions. The computer program 1003, comprises instructions which, when executed on at least one processing circuit 1004, cause the at least one processing circuit 1004 to carry out the method according to FIG. 6.

An Input/Output (I/O) module 1005, configured to be involved in, e.g. by performing, any communication to and/or from other units and/or nodes, such as sending and/or receiving information to and/or from other external nodes or devices. The I/O module may be exemplified by an obtaining, e.g. receiving, module and/or a sending module, when applicable.

The second network node 113 may also comprise other exemplifying hardware and/or software module(s) as may have been described elsewhere in the present disclosure, which module(s) may be fully or partly implemented by the processing circuit 1004. For example, the second network node 113 may further comprise a receiving module 1006, an obtaining module 1007 and/or a providing module 1008.

The second network node 113 and/or the processing module 1001 and/or the processing circuit 1004 and/or the I/O module 1005 and/or the receiving module 1006 may be operative, or configured, to perform receive, from the wireless device 120, the positioning access request, the positioning access request being configured to indicate that the access request relates to the multilateration positioning, and being configured to request the second network node 113 to estimate the TA, for the wireless device 120.

The second network node 113 and/or the processing module 1001 and/or the processing circuit 1004 and/or the I/O module 1005 and/or the obtaining module 1007 may be operative, or configured, to obtain, based on the positioning access request configured to be received, the TA value indicative of the TA in relation to the wireless device 120 and the second network node 113.

The second network node 113 and/or the processing module 1001 and/or the processing circuit 1004 and/or the I/O module 1005 and/or the receiving module 1006 may be operative, or configured, to receive, from the wireless device 120, the device identifier configured to identify the wireless device 120, and the source identifier configured to identify the first network node 110 configured to serve the wireless device 120 in the wireless communications network 100.

The second network node 113 and/or the processing module 1001 and/or the processing circuit 1004 and/or the I/O module 1005 and/or the providing module 1007 may be operative, or configured, to provide, using the source identifier configured to be received and the device identifier configured to be received, the TA value configured to be obtained in association with the cell identifier configured to identify the cell configured to be provided by the second network node 113, to at least one of: the first network node 110, and the first positioning node 133 associated with the first network node 110.

At least one of: the device identifier and the source identifier, may be configured to be received in the uplink transmission subsequent to receiving the positioning access request.

In some embodiments, at least one of: the device identifier and the source identifier, may be configured to be received comprised in one of: a) the RLC data block, and b) the uplink control message.

The device identifier may be the TLLI.

The source identifier may comprise the area identifier configured to identify the area in which the first network node 110 is located, and the cell identifier information The source identifier may be the Source Identity.

In some embodiments, the wireless device 120 is a mobile station, the first network node 110 is a serving Base Station System, BSS, the second network node 113 is a non-serving BSS, the first positioning node 133 is an SMLC node, and the wireless communication network 100 is configured to operate over a Global System for Mobile communications, GSM or an Enhanced Data rates for GSM Evolution, EDGE, network.

Figure 11:
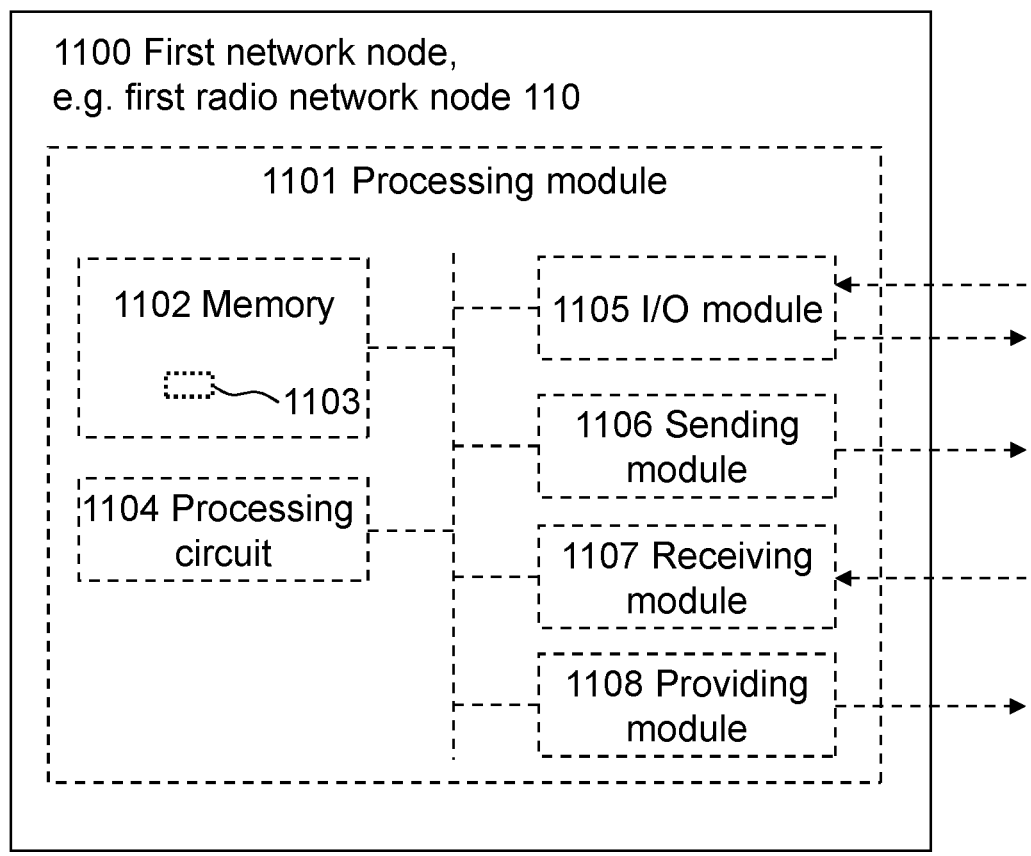

FIG. 11 is a schematic block diagram for illustrating embodiments of a first network node 1100 that may be the first radio network node 110, and how the first network node 110 may be configured to perform the methods and/or one or more actions described herein e.g. relating to FIG. 7. The description herein of the first network node 1100 will be made in reference to the first network node 110. However, any description of the first network node 110 may be understood to equally apply to the first network node 1100.

Accordingly, the first network node 110 is configured to support positioning of the wireless device 120 in the wireless communication network 100. The first network node 110 and the wireless device 120 are configured to be comprised in the wireless communication network 110.

Hence, the first network node 110 may comprise:

A processing module 1101, such as a means, one or more hardware modules, including e.g. one or more processors, and/or one or more software modules for performing said methods and/or actions.

A memory 1102, which may comprise, such as contain or store, a computer program 1103. The computer program 1103 comprises 'instructions' or 'code' directly or indirectly executable by the first network node 110 so that it performs the said methods and/or actions. The memory 1102 may comprise one or more memory units and may be further be arranged to store data, such as configurations and/or applications involved in or for performing functions and actions of embodiments herein.

A processing circuit 1104, as an exemplifying hardware module and may comprise or correspond to one or more processors. In some embodiments, the processing module 1101 may comprise, e.g. 'is embodied in the form of' or 'realized by' the processing circuit 1104. In these embodiments, the memory 1102 may comprise the computer program 1103 executable by the processing circuit 1104, whereby the first network node 110 comprising it is operative, or configured, to perform said method and/or actions. The computer program 1103, comprises instructions which, when executed on at least one processing circuit 1104, cause the at least one processing circuit 1104 to carry out the method according to FIG. 7.

An Input/Output (I/O) module 1105, configured to be involved in, e.g. by performing, any communication to and/or from other units and/or nodes, such as sending and/or receiving information to and/or from other external nodes or devices. The I/O module may be exemplified by an obtaining, e.g. receiving, module and/or a sending module, when applicable.

The first network node 110 may also comprise other exemplifying hardware and/or software module(s) as may have been described elsewhere in the present disclosure, which module(s) may be fully or partly implemented by the processing circuit 1104. For example, the first network node 110 may further comprise a sending module 1106, a receiving module 1107 and/or a providing module 1108.

The first network node 1100 and/or the processing module 1101 and/or the processing circuit 1104 and/or the I/O module 1105 and/or the receiving module 1107 is operative, or configured, to receive from the second network node 113 configured to be comprised in the wireless communication network 100, the TA value configured to be obtained by the second network node 113. The TA value configured to be obtained is indicative of the TA in relation to the wireless device 120 and the second network node 113. The TA value configured to be obtained is configured to be received in association with a) the cell identifier configured to identify the cell configured to be provided by the second network node 113 and that the access has been made to, and b) the device identifier configured to identify the wireless device 120, that the TA value relates to.

The first network node 1100 and/or the processing module 1101 and/or the processing circuit 1104 and/or the I/O module 1105 and/or the providing module 1108 is operative, or configured, to provide, to the first positioning node 133 configured to be comprised in the wireless communication network 100, the first positioning node 133 being configured to be associated with the first network node 110, the TA value configured to be received, in association with the cell identifier, and the device identifier.

The first network node 1100 and/or the processing module 1101 and/or the processing circuit 1104 and/or the I/O module 1105 and/or the sending module 1106 may be operative, or configured, to perform Action 701.

The first network node 1100 and/or the processing module 1101 and/or the processing circuit 1104 and/or the I/O module 1105 and/or the receiving module 1107 may be operative, or configured, to perform Action 703.

The device identifier may be the TLLI.

In some embodiments, the wireless device 120 is a mobile station, the first network node 110 is a serving Base Station System, BSS, the second network node 113 is a non-serving BSS, the first positioning node 133 is an SMLC node, and the wireless communication network 100 is configured to operate over a Global System for Mobile communications, GSM or an Enhanced Data rates for GSM Evolution, EDGE, network.

Figure 12A:
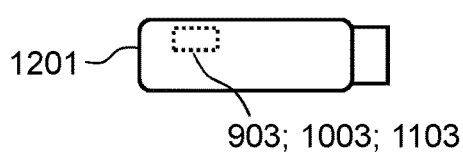
FIGS. 12*a-c* are schematic drawings illustrating embodiments relating to computer programs and computer readable media to cause the wireless device and/or second network node and/or first network node to perform, respectively, methods according to embodiments herein.
Figure 12B:
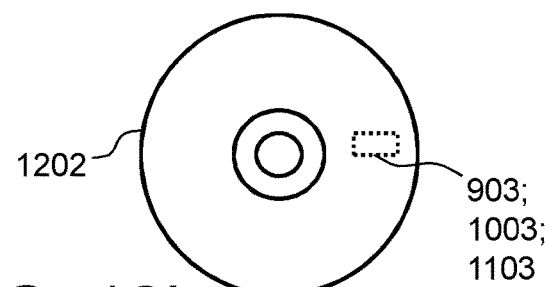
Figure 12C:
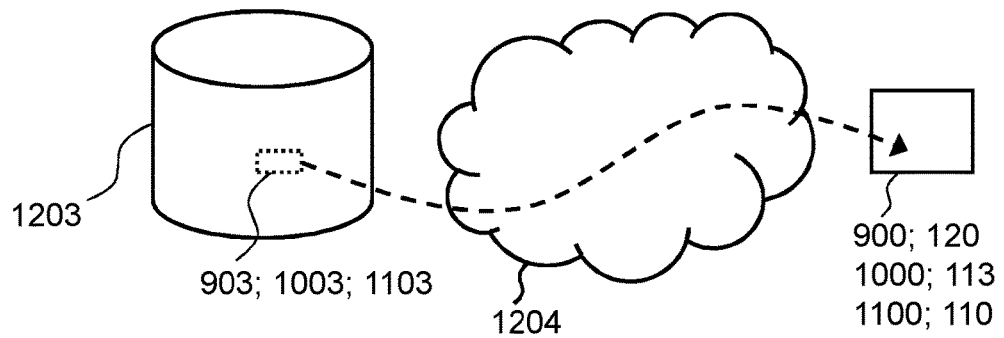
Figure 13:
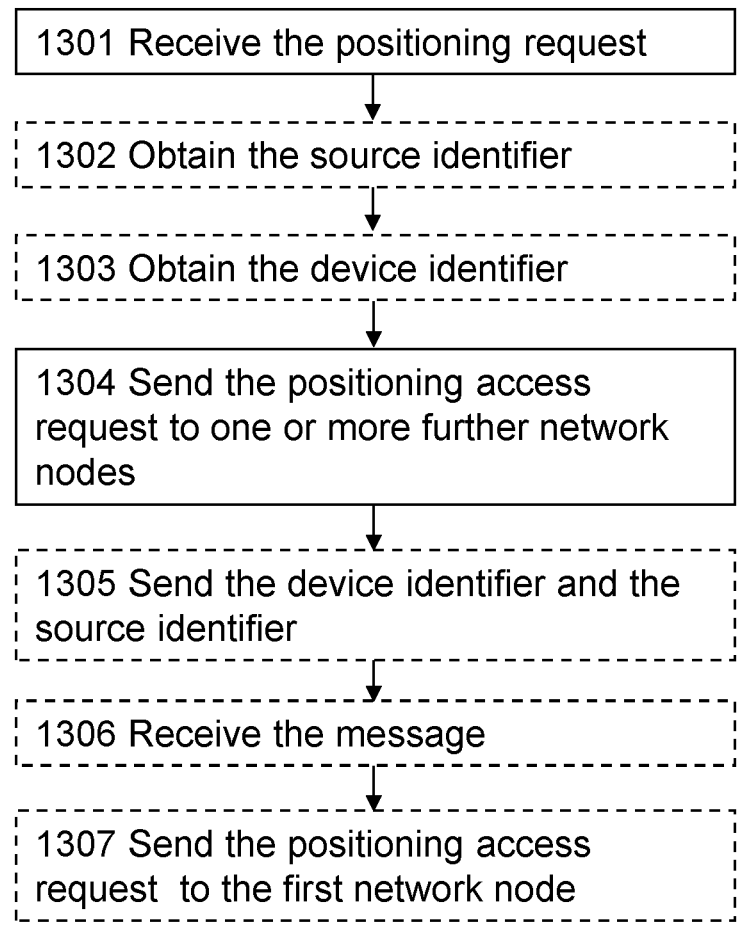
FIG. 13 is a flowchart depicting a method in a device, according to embodiments herein.
Figure 14:
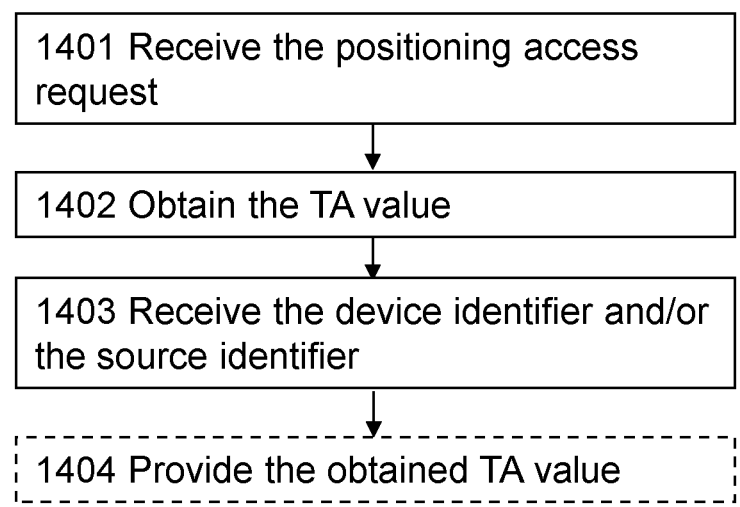
FIG. 14 is a flowchart depicting a method in a first network node, according to embodiments herein.
Figure 15:
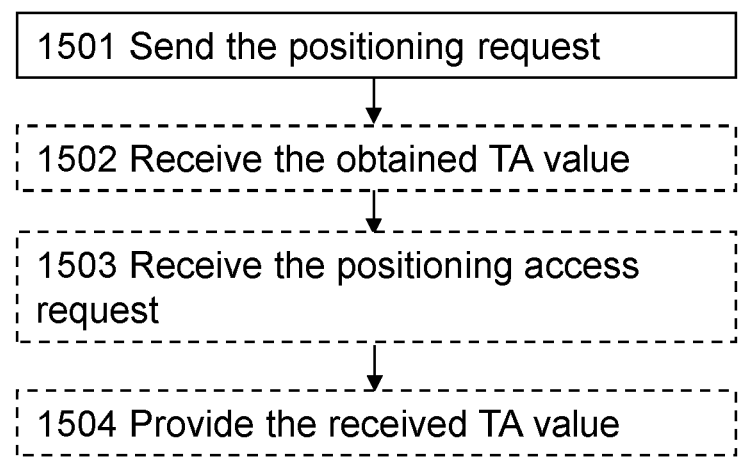
FIG. 15 is a flowchart depicting a method in a first network node, according to embodiments herein.

FIGS. 12a-c are schematic drawings illustrating embodiments relating to a computer program that may be any one of the computer programs 903, 1003 and 1103, and that comprises instructions that when executed by the respective processing circuit causes the node comprising it to perform the respective method as described above.

In some embodiments there is provided a computer program product, i.e. a data carrier, comprising a computer-readable medium and the computer program stored on the computer-readable medium. Hence, a computer-readable medium, having stored thereon a computer program 903, comprising instructions which, when executed on at least one processing circuit 904, cause the at least one processing circuit 904 to carry out the method according to FIG. 5. Similarly, a computer-readable medium, having stored thereon the computer program 1003, comprises instructions which, when executed on the at least one processing circuit 1004, causes the at least one processing circuit 1004 to carry out the method according to FIG. 6. Similarly, a computer-readable medium, having stored thereon the computer program 1103, comprises instructions which, when executed on the at least one processing circuit 1104, causes the at least one processing circuit 1104 to carry out the method according to FIG. 7. By computer readable medium may be excluded a transitory, propagating signal and the computer readable medium may correspondingly be named non-transitory computer readable medium. Non-limiting examples of the computer-readable medium is a memory card or a memory stick 1201 as in FIG. 12a, a disc storage medium 1202 such as a CD or DVD as in FIG. 12b, a mass storage device 1203 as in FIG. 12c. The mass storage device 1203 is typically based on hard drive(s) or Solid State Drive(s) (SSD). The mass storage device 1203 may be such that is used for storing data accessible over a computer network 1205, e.g. the Internet or a Local Area Network (LAN).

The computer programs, respectively, may furthermore be provided as a pure computer program or comprised in a file or files. The file or files may be stored on the computer-readable medium and e.g. available through download e.g. over the computer network 805, such as from the mass storage device 1203 via a server. The server may e.g. be a web or File Transfer Protocol (FTP) server. The file or files may e.g. be executable files for direct or indirect download to and execution on the a node for carrying out a method, e.g. by the processing circuit, or may be for intermediate download and compilation to make them executable before further download and execution causing the node(s) to perform the respective method as described above.

Note that any processing module(s) mentioned in the foregoing may be implemented as a software and/or hardware module, e.g. in existing hardware and/or as an Application Specific integrated Circuit (ASIC), a field-programmable gate array (FPGA) or the like. Also note that any hardware module(s) and/or circuit(s) mentioned in the foregoing may e.g. be included in a single ASIC or FPGA, or be distributed among several separate hardware components, whether individually packaged or assembled into a System-on-a-Chip (SoC).

Those skilled in the art will also appreciate that the modules and circuitry discussed herein may refer to a combination of hardware modules, software modules, analog and digital circuits, and/or one or more processors configured with software and/or firmware, e.g. stored in memory, that, when executed by the one or more processors make the first node and the second node to be configured to and/or to perform the above-described methods, respectively.

Identification by any identifier herein may be implicit or explicit. The identification may be unique in the wireless communication network 100 or at least in a part or some area thereof.

The term "network", or simply "NW", as used herein typically, as should be realized without any information on the contrary, refer to the wireless communication network 100.

The term "MS", as used herein typically, as should be realized without any information on the contrary, refer to the communication device 120.

The term "network node" as used herein may as such refer to any type of radio network node (described below) or any network node, which may communicate with at least a radio network node. Examples of such network nodes include any radio network node stated above, a core network node, Operations & Maintenance (O&M), Operations Support Systems (OSS), Self Organizing Network (SON) node, positioning node etc.

The term "radio network node" as used herein may as such refer to any type of network node serving a wireless device and/or that are connected to other network node(s) or network element(s) or any radio node from which a wireless device receives signals. Examples of radio network nodes are Node B, Base Station (BS), Multi-Standard Radio (MSR) node such as MSR BS, eNB, eNodeB, network controller, RNC, Base Station Controller (BSC), relay, donor node controlling relay, Base Transceiver Station (BTS), Access Point (AP), transmission points, transmission nodes, nodes in distributed antenna system (DAS) etc.

The term "communication device" or "wireless device" as used herein, may as such refer to any type of device arranged to communicate, e.g. with a radio network node, in a wireless, cellular and/or mobile communication system, such as the wireless communication network 100, and may thus be a wireless communication device. Examples include: target devices, device to device UE, device for Machine Type of Communication (MTC), MTC device, machine type UE or UE capable of machine to machine (M2M) communication, Personal Digital Assistant (PDA), iPad, Tablet, mobile terminals, smart phone, Laptop Embedded Equipment (LEE), Laptop Mounted Equipment (LME), Universal Serial Bus (USB) dongles etc. While said terms are used frequently herein for convenience, or in the context of examples involving other 3GPP nomenclature, it must be appreciated that the term as such is non-limiting and the teachings herein apply to essentially any type of wireless device.

The term "node" as used herein may as such refer to any type of network node or wireless device, such as described above.

Note that although terminology used herein may be particularly associated with and/or exemplified by certain cellular communication systems, wireless communication networks etc., depending on terminology used, such as wireless communication networks based on 3GPP, this should as such not be seen as limiting the scope of the embodiments herein to only such certain systems, networks etc.

As used herein, the term "memory" may refer to a hard disk, a magnetic storage medium, a portable computer diskette or disc, flash memory, random access memory (RAM) or the like. Furthermore, the memory may be an internal register memory of a processor.

Also note that any enumerating terminology such as first network node, second network node, first base station, second base station, or similar, that may have been used herein, as such should be considering non-limiting and the terminology as such does not imply a certain hierarchical relation. Without any explicit information in the contrary, naming by enumeration should be considered merely a way of accomplishing different names.

Examples Related to Embodiments Herein:

An alternative for providing derived Timing advance information, and corresponding cell identity, to a serving controller node, e.g. BSS, may be to have the wireless device 120 be told to return to the serving cell in the response to sending an access request in a cell not managed by the serving BSS. Upon arriving in the serving cell it may send an access request that may result in it being assigned an uplink TBF which it may use to send the derived Timing advance information and corresponding Cell Identity to the serving BSS, which may then forward the information to the serving positioning node.

An example of a method applicable to the any of above may comprise:

1. Assistance information in an RRLP message, sent to the MS to trigger Multilateration, may indicate one or more cells for which the MS may send an access request in which a Short ID may be included, i.e., the MS does not need to send an RLC data block including a TLLI to be uniquely recognized, and one or more cells for which the Short ID may not be used, that is, an RLC data block including a TLLI may be needed.

2. The MS may have no choice but to use RLC data block transmission, that includes the TLLI, for those cells for which the assistance information indicates Short ID may not be used.

3. For all other cells, the MS may use Short ID in the access request sent on a RACH/EC-RACH, i.e., it may assume the BSS will recognize the Short ID, and may then proceed as follows:

If it gets an AGCH/EC-AGCH message indicating "Short ID recognized" then it may consider Multilateration to be completed for that cell.

If it gets an AGCH/EC-AGCH message indicating "TLLI Required" and including an UL TBF assignment, then it may remain in the non-serving cell and send an RLC data block that includes TLLI+Source Identity.

If it gets an AGCH/EC-AGCH message indicating "TLLI Required" and including a TA value+e.g. BSS Symbol Granularity Capability corresponding to the TA value+ e.g. Cell ID corresponding to the TA value, then it may return to the serving cell where it may send another access request that excludes the Short ID, otherwise the serving BSS may incorrectly assume no uplink TBF needs to be assigned since it may recognize the Short ID. The MS may need to be assigned an uplink TBF since the TLLI may not be conveyed from the MS to the BSS without an uplink TBF, and the AGCH/EC-AGCH message indicated "TLLI Required". The MS may still need to indicate "Multilateration" when sending the access request in the serving cell, and it may receive an UL TBF assignment therein, and may then send an RLC data block that includes TLLI+TA value+ Cell ID corresponding to the TA value+e.g. BSS Symbol Granularity Capability corresponding to the TA value.

An advantage of the MS returning to the serving cell and sending another access request, and a subsequent RLC data block, is that it may typically experience better coverage in the serving cell, e.g., it may typically experience a lower coverage class (CC) to send a 2nd access request and a subsequent RLC data block in the serving cell, which is expected to consume less energy than remaining in the original non-serving cell using a higher CC to send the subsequent RLC data block.

However, in some cases, the coverage class experienced in the non-serving cell may be just as good as coverage class typically expected in the serving cell, in which case the MS may experience less battery drain by remaining in the non-serving cell to send the subsequent RLC data block, i.e., one less access request may need to be transmitted by remaining in the non-serving cell.

A need to have "2 flavors" of a Multilateration access request, one with a Short ID and one without Short ID, may effectively reduce the size of the Short ID that may be able to be fitted into the Multilateration access request messages sent on the RACH/EC-RACH.

According to the foregoing, in some examples related to embodiments herein, the positioning request may comprise a Short Identifier (Short ID), assigned to the device by the positioning node. The Short ID may be known by the positioning node, the first network node and the device, and by one or more of the further network nodes.

For example, the device identifier may be comprised in the positioning access request, when it is the Short ID.

It may be indicated in the positioning request, see Action 1301, which of the one or more network nodes that a Short ID may and/or may need to be used for, and thus e.g., that supports Short ID, and/or which of these nodes TLLI may or should be used for. It may e.g., be assumed that TLLI may and should be used for all and/or for those not indicated to support Short ID. The device may use this information to determine what kind of identifier to be obtained in Action similar to Action 503 and/or to be used in the Action similar to Action 505.

In some examples, the positioning access request may comprise the device identifier, without the need of including the source identifier. The device identifier may typically be the Short ID in these examples.

In a first subgroup of examples, the message in the Action similar to Action 506 may indicate that the further network node has recognized the Short ID. This may also indicate that the further network node is able to provide the TA value estimated for the device 120 to the positioning node without further involvement by the device. The device may therefore consider the positioning procedure completed for the further network node in question. The same may be understood to apply to another further network node, e.g., any other further network node indicated in the positioning request received in Action 501, which may be not be a non-serving network node.

In a second subgroup of examples, the message in the Action similar to Action 506 may instead indicate that the Short ID is not sufficient and/or that a further or other device identifier, e.g. TLLI, is required, and the message may comprise an uplink assignment, e.g. an uplink TBF assignment. The device may then, in response to this, proceed as for the first group of examples above, e.g. according to the first or second example.

In a third subgroup of examples, the message in the Action similar to Action 506 may instead indicate that the Short ID is not sufficient and/or that a further or other device identifier, e.g. TLLI, is required, and the message may also comprise the TA value provided by the further network node. This may also apply to another further network node. The message may also comprise a cell identifier identifying the cell provided by the second network node 113 and that the access has been made to, although the device in some embodiments may already have obtained a cell identifier of this cell prior to sending the positioning request, e.g. when performing measurements to identify available cells.

Other Examples Related to Embodiments Herein May e.g. Comprise:

A first method, performed by a device, e.g. the wireless device 120, such as a MS. The method may be for supporting positioning of the device in a wireless communication network, e.g. the wireless communication network 100, in particular positioning based on multilateration.

Receiving 1301, similarly to Action 501, from a first, e.g. serving, network node, e.g. the radio network node 110, such as a BSS, a positioning request. The device may be served in the wireless communication network 100 by the first network node when receiving the positioning request. The positioning request is a request the requests the device to initiate and/or participate in a positioning procedure, e.g. multilateration. The positioning request may be sent by a positioning node associated with the first network node 110, e.g. the first positioning node 133, such as a Serving Mobile Location Center (SMLC), via the first network node 110, to the wireless device 120.

Herein, the a network node, such as the first network node, receiving the positioning request from the first positioning node, may be referred to as a serving network node and may be serving the device when the positing request is receive and the positing procedure initiated but need not be serving the device during the entire method. The positioning node sending the positioning request, via the first network node, to the device may similarly be referred to as a serving positioning node.

This action may fully or partly correspond to Action 801.

The device 900 and/or the processing module 901 and/or the processing circuit 904 and/or the I/O module 905 and/or the receiving module 906 may be operative, or configured, to perform this action.

In some embodiment the first method comprises the following action:

Obtaining 1302, similarly to Action 502, a source identifier identifying the first network node.

This action may fully or partly correspond to Action 803.

The device 900 and/or the processing module 901 and/or the processing circuit 904 and/or the I/O module 905 and/or the obtaining module 907 may be operative, or configured, to perform this action.

In some embodiment the first method comprises the following action:

Obtaining 1303, similarly to Action 503, a device identifier identifying the device. The device identifier may be a temporary identifier, e.g. a TLLI, identifying the device, or a Short IDentifier (Short ID).

This action may fully or partly correspond to Action 802.

The device 900 and/or the processing module 901 and/or the processing circuit 904 and/or the I/O module 905 and/or the obtaining module 907 may be operative, or configured, to perform this action.

Sending 1304, similarly to Action 504, in response to the positioning request, to each one of one or more other, further, or non-serving, network nodes, i.e. other than the first network node, typically radio network nodes, such as the second network node 113, one or more positioning access requests, respectively.

This action may fully or partly correspond to Action 804*a*.

The device 900 and/or the processing module 901 and/or the processing circuit 904 and/or the I/O module 905 and/or the sending module 908 may be operative, or configured, to perform this action.

Sending 1305, similarly to Action 505, the obtained device identifier to a further network node, e.g. the second network node 113, of the one or more further network nodes in Action 1304.

This action may fully or partly correspond to Action 804*a* and 804*c*.

The device 900 and/or the processing module 901 and/or the processing circuit 904 and/or the I/O module 905 and/or the sending module 908 may be operative, or configured, to perform this action.

The following action is further included in the second group of embodiments:

Receiving 1306, similarly to Action 506, from the further network node in response to the sent positioning access request, a message that may be named an access grant message.

This action may fully or partly correspond to Action 804*b*.

The device 900 and/or the processing module 901 and/or the processing circuit 904 and/or the I/O module 905 and/or the receiving module 906 may be operative, or configured, to perform this action.

The third subgroup of embodiments further include one or more of the following actions:

Sending 1307, similarly to Action 507, in response to the received message, to the first network node, a positioning access request corresponding to the positing access request described above, i.e. typically on a RACH, e.g. EC-RACH, etc., but this positioning access request should preferably exclude the Short ID.

The device may then receive, from the first network node, in response to the positioning access request sent to the first network node, an uplink assignment, e.g. uplink TBF assignment, typically on an AGCH, e.g. a EC-AGCH.

The device may then send to the first network node, in response to the to the positioning access request, e.g. using the uplink assignment, said other device identifier, e.g. TLLI, the TA value and the cell identifier, e.g. comprised in a data block, e.g. RLC data block.

An advantage with the third subgroup, i.e. with sending the TLLI to the first network node and not back to the further network node, may be that the coverage is typically better for the first network node that the device was served in when the positioning procedure was initiated, and hence energy may be saved.

It may further be realized that the end result for second group of embodiments, such as the first, second and third subgroup of embodiments, is the same as for the embodiments of the first group discussed above. Hence also the second group of embodiments enable a solution to the problem indicated in the Background and thus provides an improvement with regard to positioning, such as multilateration, in a wireless communication network.

This action may fully or partly correspond to Action 808*a*.

The device 900 and/or the processing module 901 and/or the processing circuit 904 and/or the I/O module 905 and/or the sending module 908 may be operative, or configured, to perform this action.

A second method, performed by a further, or second, network node, e.g. the second radio network node 113, such as a BSS. The further network node may be one of the further network nodes discussed above for the first method. The second method may be for supporting positioning of a device, e.g. the wireless device 120, such as a MS, in a wireless communication network, e.g. the wireless communication network 100, in particular positioning based on multilateration. Also the wireless device may be as discussed above for the first method.

The second method comprises one or more of the following actions:

Receiving 1401, similarly to Action 601, from the device, a positioning access request. The positioning access request may be as or one of the positioning access requests described above for the first method in Action 504.

This action may fully or partly correspond to Action 804a.

The second network node 1000 and/or the processing module 1001 and/or the processing circuit 1004 and/or the I/O module 1005 and/or the receiving module 1006 may be operative, or configured, to perform this action.

Obtaining 1402, similarly to Action 602, a TA value, indicative of a TA in relation to the device and the further network node, and e.g. associated with the device and the further network node, or rather a distance there between.

This action may fully or partly correspond to Action 806.

The second network node 1000 and/or the processing module 1001 and/or the processing circuit 1004 and/or the I/O module 1005 and/or the obtaining module 1007 may be operative, or configured, to perform this action.

Receiving 1403, similarly to Action 603, from the device, a device identifier and/or a source identifier. The device identifier and the source identifier may be as described above for the first method, see e.g. Action 505.

This action may fully or partly correspond to Action 804a and Action 804c.

The second network node 1000 and/or the processing module 1001 and/or the processing circuit 1004 and/or the I/O module 1005 and/or the receiving module 1006 may be operative, or configured, to perform this action.

Providing 1404, similarly to Action 604, to the first network node and/or the first positioning node, the obtained TA value, typically in association with a cell identifier, and/or network node identifier, identifying the further network node, using the source identifier and/or device identifier.

This action may fully or partly correspond to Action 807.

The second network node 1000 and/or the processing module 1001 and/or the processing circuit 1004 and/or the I/O module 1005 and/or the providing module 1007 may be operative, or configured, to perform this action.

A third method, performed by a first network node, e.g. the first radio network node 113, such as a BSS. The first network node may be the first network node discussed above for the first and second method. The third method may be for supporting positioning of a device, e.g. the wireless device 120, such as a MS, in a wireless communication network, e.g. the wireless communication network 100, in particular positioning based on multilateration. Also the wireless device may be as discussed above for the first and second methods.

The third method comprises one or more of the following actions:

Sending 1501, similarly to Action 701, such as forwarding from a positioning node, e.g. the first positioning node 133, a positioning request to a device, e.g. the wireless device 120. The positioning access request may be as described above for the first method in Action 501.

This action may fully or partly correspond to Action 801.

The first network node 1100 and/or the processing module 1101 and/or the processing circuit 1104 and/or the I/O module 1105 and/or the sending module 1106 may be operative, or configured, to perform this action.

The third method may comprise the following action:

Receiving 1502, similarly to Action 702, from a further network node, e.g. the second radio network node 113, an obtained TA value obtained by the further network node, typically received in association with a cell identifier, and/or network node identifier, identifying the further network node. The TA value may also be received in association with a device identifier identifying a device, e.g. the wireless device 120, that the TA value relates to.

The further network node, the obtained TA value, the cell identifier, the network node identifier, the device identifier may be as described above for the first and second methods.

This action may fully or partly correspond to Action 807.

The first network node 1100 and/or the processing module 1101 and/or the processing circuit 1104 and/or the I/O module 1105 and/or the receiving module 1107 may be operative, or configured, to perform this action.

In some embodiments, corresponding to the third sub-group of embodiments described above, the third method comprises:

Receiving 1503, similarly to Action 703, from the device, a positioning access request. The access request may be the positioning access request described above for the first method in Action 507. The first network node may respond to this positioning access request as also indicated in connection with Action 507. As a result, the first network node 110 will receive the TA value etc., that may be in association with corresponding information as described above for the second method and Action 604.

This action may fully or partly correspond to Actions 808a-c.

The first network node 1100 and/or the processing module 1101 and/or the processing circuit 1104 and/or the I/O module 1105 and/or the receiving module 1107 may be operative, or configured, to perform this action.

The first network node may then similarly as described for Action 604 provide the TA values etc. to the first positioning node. Hence, the third method may further comprise:

Providing 1504, similarly to Action 704, to the first positioning node, the obtained TA value, typically in association with a cell identifier, and/or network node identifier, identifying the further network node.

This action may fully or partly correspond to Actions 809.

The first network node 1100 and/or the processing module 1101 and/or the processing circuit 1104 and/or the I/O module 1105 and/or the providing module 1108 may be operative, or configured, to perform this action.

Device examples are exemplified in relation to e.g. FIGS. 4, 5, 8, 13 and 9.

Further network node examples are exemplified in relation to e.g. FIGS. 4, 6, 8, 14 and 10.

First network node examples are exemplified in relation to e.g. FIGS. 4, 7, 8, 15 and 11.

The invention claimed is:

1. A method, performed by a wireless device, for supporting positioning of the wireless device in a wireless communication network, the wireless device being comprised in the wireless communication network, the method comprising:

receiving, from a first network node, a positioning request, wherein the wireless device is served in the wireless communication network by the first network node when receiving the positioning request, wherein the positioning request requests the wireless device to initiate a multilateration positioning procedure, and wherein the positioning request is sent by a first positioning node associated with the first network node and comprised in the wireless communication network, and in response to the received positioning request:

sending to a second network node comprised in the wireless communication network, a positioning access request indicating that the positioning access request relates to a multilateration positioning procedure and requesting the second network node to estimate a Timing Advance (TA) for the wireless device as part of the multilateration positioning procedure, and sending, to the second network node, an obtained device identifier and an obtained source identifier, the obtained device identifier identifying the wireless device, and the obtained source identifier identifying the first network node.

2. The method according to claim 1, wherein at least one of the obtained device identifier and the obtained source identifier is sent in an uplink transmission subsequent to sending the positioning access request.

3. The method according to claim 2, wherein at least one of the obtained device identifier and the obtained source identifier is sent comprised in one of: a) a Radio Link Control (RLC) data block and b) an uplink control message.

4. The method according to claim 1, wherein the source identifier comprises:

cell identifier information; and an area identifier identifying an area in which the first network node is located.

5. A method, performed by a second network node, for supporting positioning of a wireless device in a wireless communication network, the second network node and the wireless device being comprised in the wireless communication network, the method comprising:

receiving, from the wireless device, a positioning access request, the positioning access request indicating that the positioning access request relates to a multilateration positioning procedure, and requesting the second network node to estimate a Timing Advance (TA) for the wireless device, obtaining, based on the received positioning access request, a Timing Advance (TA) value indicative of a TA in relation to the wireless device and the second network node, receiving, from the wireless device, a device identifier identifying the wireless device, and a source identifier identifying a first network node serving the wireless device in the wireless communications network, and providing, using the received source identifier and the received device identifier, the obtained TA value in association with a cell identifier identifying a cell provided by the second network node, to at least one of: the first network node, and a first positioning node associated with the first network node.

6. The method according to claim 5, wherein at least one of the device identifier and the source identifier is received in an uplink transmission subsequent to receiving the positioning access request.

7. The method according to claim 6, wherein at least one of the device identifier and the source identifier is received comprised in one of: a) a Radio Link Control (RLC) data block, and b) an uplink control message.

8. The method according to claim 5, wherein the source identifier comprises:

cell identifier information; and an area identifier identifying an area in which the first network node is located.

9. A method, performed by a first network node, for supporting positioning of a wireless device in a wireless communication network, the first network node serving the wireless device, the first network node and the wireless device being comprised in the wireless communication network, the method comprising:

Receiving, from a second network node comprised in the wireless communication network, an obtained Timing Advance (TA) value obtained by the second network node, wherein the obtained TA value is indicative of a TA in relation to the wireless device and the second network node, and wherein the obtained TA value is received in association with a cell identifier and a device identifier, wherein the cell identifier identifies a cell provided by the second network node and that access has been made to, and wherein the device identifier identifies the wireless device that the TA value relates to; and providing, to a first positioning node that is comprised in the wireless communication network and that is associated with the first network node, the received TA value, in association with the cell identifier and the device identifier.

10. The method according to claim 9, wherein the wireless device is a mobile station, the first network node is a serving Base Station System (BSS), the second network node is a non-serving BSS, the first positioning node is a Serving Mobile Location Center (SMLC) node, and wherein the wireless communication network operates over a Global System for Mobile communications (GSM) or an Enhanced Data rates for GSM Evolution (EDGE) network.

11. A wireless device configured to support positioning of the wireless device in a wireless communication network, the wireless device being configured to be comprised in the wireless communication network, the wireless device comprises:

a processing circuit and a memory, the memory comprising a computer program executable by the processing circuit whereby the wireless device is configured to:

receive, from a first network node, a positioning request, wherein the wireless device is served in the wireless communication network by the first network node when receiving the positioning request, wherein the positioning request requests the wireless device to initiate a multilateration positioning procedure and is sent by a first positioning node associated with the first network node and comprised in the wireless communication network, and in response to the received positioning request:

send, to a second network node configured to be comprised in the wireless communication network, a positioning access request indicating that the positioning access request relates to a multilateration positioning procedure and requesting the second network node to estimate a Timing Advance (TA) for the wireless device as part of the multilateration positioning procedure, and send, to the second network node, a device identifier and a source identifier, the device identifier identifying the wireless device, and the source identifier identifying the first network node.

12. The wireless device according to claim 11, wherein at least one of the device identifier and the source identifier is sent in an uplink transmission subsequent to sending the positioning access request.

13. The wireless device according to claim 12, wherein at least one of the device identifier and the source identifier is sent comprised in one of: a) a Radio Link Control (RLC) data block, and b) an uplink control message.

14. The wireless device according to claim 11, wherein the source identifier comprises:
cell identifier information; and
an area identifier identifying an area in which the first network node is located.

15. A second network node configured to support positioning of a wireless device in a wireless communication network, the second network node and the wireless device being configured to be comprised in the wireless communication network, the second network node comprising:
a processing circuit and a memory, the memory comprising a computer program executable by the processing circuit whereby the second network node is configured to:
receive, from the wireless device, a positioning access request, the positioning access request indicating that the positioning access request relates to a multilateration positioning procedure, and requesting the second network node to estimate a Timing Advance (TA) for the wireless device,
obtain, based on the received positioning access request, a Timing Advance (TA) value indicative of a TA in relation to the wireless device and the second network node,
receive, from the wireless device, a device identifier identifying the wireless device, and a source identifier identifying a first network node serving the wireless device in the wireless communications network, and
provide, using the received source identifier and the received device identifier, the obtained TA value in association with a cell identifier identifying a cell provided by the second network node, to at least one of: the first network node, and a first positioning node associated with the first network node.

16. The second network node according to claim 15, wherein at least one of the device identifier and the source identifier is received in an uplink transmission subsequent to receiving the positioning access request.

17. The second network node according to claim 16, wherein at least one of the device identifier and the source identifier is received comprised in one of: a) a Radio Link Control (RLC) data block, and b) an uplink control message.

18. The second network node according to claim 15, wherein the source identifier comprises:
cell identifier information; and
an area identifier identifying an area in which the first network node is located.

19. A first network node configured to support positioning of a wireless device in a wireless communication network, the first network node being configured to serve the wireless device, the first network node and the wireless device being configured to be comprised in the wireless communication network, the first network node comprising:
a processing circuit and a memory, the memory comprising a computer program executable by the processing circuit whereby the first network node is configured to:
receive, from a second network node comprised in the wireless communication network, an obtained Timing Advance (TA) value obtained by the second network node, wherein the obtained TA value is indicative of a TA in relation to the wireless device and the second network node, and wherein the obtained TA value is received in association with a cell identifier and a device identifier, wherein the cell identifier identifies a cell provided by the second network node and that access has been made to, and wherein the device identifier identifies the wireless device that the TA value relates to; and
provide, to a first positioning node that is comprised in the wireless communication network and that is associated with the first network node, the received TA value, in association with the cell identifier and the device identifier.

20. The first network node according to claim 19, wherein the wireless device is a mobile station, the first network node is a serving Base Station System (BSS), the second network node is a non-serving BSS, the first positioning node is a Serving Mobile Location Center (SMLC) node, and wherein the wireless communication network operates over a Global System for Mobile communications (GSM) or an Enhanced Data rates for GSM Evolution (EDGE) network.

* * * * *